(12) United States Patent
Moya et al.

(10) Patent No.: US 6,469,405 B1
(45) Date of Patent: Oct. 22, 2002

(54) CONSTANT-CURRENT OUTPUT DRIVER WITH REDUCED OVER-SHOOT

(75) Inventors: Yasuhiro Moya; Tatsuya Kitta; Yoshihide Kanakubo; Tadao Akamine, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/493,773

(22) Filed: Jan. 28, 2000

(30) Foreign Application Priority Data

| Jan. 29, 1999 | (JP) | ............................................ | 11-022889 |
| Jun. 1, 1999 | (JP) | ............................................ | 11-153933 |
| Jun. 11, 1999 | (JP) | ............................................ | 11-165527 |
| Jan. 17, 2000 | (JP) | ............................................ | 2000-008208 |

(51) Int. Cl.$^7$ ............................................... H01H 35/00
(52) U.S. Cl. ...................................................... 307/130
(58) Field of Search .................................. 307/108, 112, 307/116, 117, 125, 130, 131, 157

(56) References Cited

U.S. PATENT DOCUMENTS 4,182,977 A * 1/1980 Stricklin, Jr.
6,078,347 A * 6/2000 Nukui

* cited by examiner

*Primary Examiner*—Edward H. Tso
(74) *Attorney, Agent, or Firm*—Adams & Wilks

(57) ABSTRACT

A constant-current FET functions as a constant current element by application of a constant voltage to the gate thereof. A first switch FET is disposed between the constant-current FET and a power supply without another switching element being disposed between the constant current FET and an output terminal. A second switch FET that performs an on/off operation in association with an on/off operation performed by the first switch FET is connected between the output terminal and ground.

21 Claims, 30 Drawing Sheets

CONSTANT-CURRENT OUTPUT DRIVER WITH REDUCED OVER-SHOOT

BACKGROUND OF THE INVENTION

The present invention relates to a constant current output driver, for example, a constant current output driver for emitting a light from a light emitting element such as an organic EL (electro luminescent) panel.

A light emitting diode (LED) and an organic EL (also called "organic LED") has widely been spread as an image source in a display unit such as a direct-view display unit or a virtual image display unit since a high visibility is obtained because the light emitting diode and the organic EL per se emit a relatively large amount of high-luminance light, and a display speed is higher than that of a TFT (thin film transistor) liquid crystal or the like to make it difficult to produce a latent image. Since the display panel using those LED or organic EL is of the current driven type, a constant current output driver is employed in the drive device.

FIG. 22 shows the structure of a conventional display device using the organic EL of this type.

As shown in FIG. 22, the organic EL display unit includes an organic EL panel 1, a scanning circuit 2, a drive circuit 3 and a not-shown light emission control circuit that controls the switching operation of the scanning circuit 2 and the drive circuit 3.

The organic EL panel 1 includes anode lines A1 to Am and cathode lines B1 to Bn which are arranged in a simple matrix (lattice), and organic EL elements E11 to Emn connected to the respective intersecting positions of the anode lines and the cathode lines which are arranged in the form of a lattice. The cathode lines B1 to Bn are connected to a scanning circuit 51, and the anode lines A1 to Am are connected to the drive circuit 3.

The scanning circuit 2 includes switches S21 to S2n and conducts scanning operation by sequentially setting the cathode lines B1 to Bn to the earth potential (0 V) while those switches S21 to S2n sequentially change over to the earth terminal side at given time intervals.

The drive circuit 3 includes switches S31 to S3m and constant current elements C31 to C2m connected to a power supply VDD. The drive circuit 3 is so designed as to connect the anode lines A1 to Am to the constant current elements C31 to C3m while controlling the on/off operation of the respective switches S31 to S3m in synchronism with the scanning operation of the cathode line scanning circuit 2 and to supply a drive current to the organic EL at a desired intersecting position, to thereby emit a light.

A case in which the cathode lines are scanned and the anode lines are driven is shown in FIG. 22. The same effect is obtained in the structure in which the anode lines are scanned and the cathode lines are driven.

Now, it is assumed that the switch S22 in the scanning circuit 2 is connected to the earth side to scan a row of the cathode line B2. At this timing, when the switches S31 and S33 in the drive circuit 3 are changed over to the constant current elements C31 and C33 side (turn on), currents I12 and I13 flow in the light emitting elements E12 and E32 to emit a light.

An inverse bias voltage VCC identical in potential with the supply voltage is applied to other cathode lines B1 and B3 to Bn other than the cathode line B2 which is being scanned, to thereby prevent an error in light emission.

The organic EL is made to emit a light at an arbitrary position by repeating the scanning of the cathode lines B1 to Bn and the driving of the anode lines A1 to Am at a high speed, and display is made so that the respective organic ELs emit a light on the entire screen at the same time.

In this situation, in order to prevent the amount of light emission from being made ununiform due to a difference between the current values that flow in the respective organic ELs which is caused by a difference in the wiring distance between the organic ELs, the respective anode lines A1 to Am are connected to the constant current elements C31 to C3m that function as the constant current source through the switches S31 to S3m.

FIG. 23 shows the unknown structure proposed in a case where the conventional constant current output driver made up of the constant current elements of the above type and the switches that connect and disconnect the constant current elements and the anode lines is formed of the enhancement MOSFET (metal oxide field effect transistor).

As shown in FIG. 23, the constant current output driver is designed such that a p-channel MOSFET 4 that functions as the constant current element, and a p-channel MOSFET 5 and an n-channel MOSFET 6 which function as the switching elements are connected in series. The supply voltage VDD is applied to the drain of the MOSFET 4, and a voltage VGC which is always constant is applied to the gate of the MOSFET 4 in order to output a constant current.

An input terminal IN is connected to both the gates of the MOSFETs 5 and 6, an output terminal OUT is connected to the source of the MOSFET 5 and the drain of the MOSFET 6, and the anode lines of the organic EL panel are connected to the output terminal OUT.

In the constant current output driver made up of the MOSFETs as described above, when a switching signal which is supplied to the input terminal changes from on (high level) to off (low level), the MOSFET 6 changes from on to off and the MOSFET 5 changes from off to on. As a result, the output terminal OUT which has been connected to the ground is connected to the MOSFET 4 which functions as the constant current element through the MOSFET 5 to output a constant current.

FIG. 25 shows the structure of a display unit using organic ELS for color display.

As shown in FIG. 25, in an organic EL panel 1 for color display, three times as many anode lines A1 to As (s=3m) as in a monochrome display are disposed, and anode terminals Al to As for connection to the drive circuit are disposed.

In the organic EL panel 1 for color display, organic ELs for red (R) are connected at the intersecting positions of anode lines A1, A4, . . . As−2 and the respective cathode lines B1 to Bn, organic ELs for green (G) are connected at the intersecting positions of anode lines A2, A5, . . . As−1 and the respective cathode lines B1 to Bn, and organic ELs for red (R) are connected at the intersecting positions of anode lines A3, A6, . . . As and the respective cathode lines B1 to Bn, as in FIG. 22 although being not shown.

Those light emitting elements for R, G and B are different in optimum constant current value, respectively, when emitting the light. For that reason, as shown in FIG. 25, in the conventional drive circuit that drives the organic EL panel 1 for color display, there are used a drive circuit 3R for R, a drive circuit 3G for G and a drive circuit 3B for B. Each of the drive circuits 3R, 3G and 3B includes m (s/3) constant current output sections and m constant current output terminals O1 to Om.

As shown in FIG. 25, in order to drive the organic ELs for R which are disposed at every three organic ELs, the respective output terminals O1 to Om of the drive circuit 3R for R are connected with the anode terminals A1, A4, . . . As–2 of the organic EL panel 1 for color display. Likewise, the respective output terminals O1 to Om of the drive circuit 3GR for G are connected with the anode terminals A2, A5, . . . As–12 of the organic EL panel 1 for color display, and the respective output terminals O1 to Om of the drive circuit 3B for B are connected with the anode terminals A3, A6, . . . As.

As described above, in the case where the conventional constant current output driver is formed of MOSFETs as. shown in FIG. 23, the current flowing in the respective organic EL elements can be made substantially constant by use of the constant current element.

However, the conventional constant current output driver suffers from the following problems.

A first problem is that over-shoot occurs in the current outputted from the output terminal OUT of the conventional respective constant current output drivers, and there actually exists a moment where a current equal to or more than a given current flows in the light emitting element.

FIG. 24 shows the simulation result of an output current in the constant current output driver shown in FIG. 23. As shown in FIG. 24, a large current indicated by an arrow A flows as soon as the constant current output turns on, and a large current indicated by an arrow B flows as soon as the constant current output turns off.

The current indicated by the arrow A is that charges charged in the source of the MOSFET 5 while the MOSFET 5 shown in FIG. 23 is off flows in the output terminal as soon as the MOSFET 5 turns on. At the same time, the current flows in the minus direction but is canceled by the above current and does not appear in the figure. This current in the minus direction is that a high frequency component flows through the capacitor of a gate insulating film because the gate voltage IN of the MOSFET 5 and the MOSFET 6 changes from VDD to the ground.

The current indicated by the arrow B is that a high frequency component flows through the capacitor of the gate insulating film because the gate voltage IN of the MOSFET 5 and the MOSFET 6 changes from the ground to VDD.

The current in the minus direction indicated by an arrow C is a current resulting from discharging the charges stored in the capacity component of the organic EL connected to the output terminal OUT to the ground, which is not abnormal.

A second problem is stated below.

In the case of driving the organic EL panel, because a wiring resistance is large, the wiring resistance is largely different because of a difference in the wiring length due to the. position of the organic EL elements on the organic EL panel 1 shown in FIG. 22. Therefore, a voltage applied to the respective constant current elements is also largely different. As a result, a demand exits for the constant current element of the drive circuit 3 that the voltage dependency change of the output current value is very small. However, in the case where the conventional constant current output driver is formed of MOSFETs as shown in FIG. 23, in order to reduce the voltage dependency change of the output constant current value, it is necessary to increase the gate length of the p-channel MOSFET 4 that functions as the constant current element with a problem that the IC chip size of the drive circuit 3 increases.

A third problem is that if the MOSFET is employed as the constant current element of the constant current output driver as shown in FIG. 23, the switching noise adversely affects the gate potential of the MOSFET 4 that functions as the constant current element, and the constant current value fluctuates. In the case where the organic EL panel using a plurality of drivers is driven, because many noises are received at various timings, a larger problem is caused.

A fourth problem is stated below.

The MOSFET has a temperature characteristic that the output current value changes in accordance with the temperature change. Also, the current value outputted from the constant current FET 50 is nearly proportional to the square of the gate voltage.

For that reason, if a constant voltage VGC is always applied to the gate G of the constant current FET 50 regardless of the temperature change, there arises such a problem that the output current largely changes in accordance with the temperature change.

A fifth problem is stated below.

In the conventional constant current output driver in the case where color display is conducted using the organic ELs, the m constant current output sections that drive the light emitting elements for R are disposed in the drive circuit 3R for R together, the m constant current output sections that drive the light emitting elements for G are disposed in the drive circuit 3R for G together, and the m constant current output sections that drive the light emitting elements for B are disposed in the drive circuit 3R for G together. On the other hand, the respective light emitting elements of the organic EL panel 1 for color display and their anode terminals A1 to As are disposed in the order of R, G and B.

For that reason, in the case where the drive circuit 3R for R, the drive circuit 3G for G and the drive circuit 3B for B are connected to the organic EL panel 1 for color display, because the wirings intersects with each other as shown in FIG. 25, multi-layer wirings must be provided, to thereby increase the costs.

Also, in the case where the organic EL panel 1 for color display is mounted on a COG (chip on glass), because it is extremely difficult to provide the multi-layer wirings, the display device could not be substantially mounted on the COG with the structure shown in FIG. 25.

The present invention has been made in order to solve the above-described problems, and therefore an object of the present invention is to provide a constant current output driver which reduces the occurrence of over-shoot at the first, which is extremely small in the voltage dependency change of the output constant current value at the second, which reduces the adverse affect of the switching noise on the constant current property at the third, which reduces a change in the output current value due to the temperature change at the fourth, and which can be connected to the light emitting element panel for color display through single-layer wirings.

SUMMARY OF THE INVENTION

In the present invention as recited in claim 1, as conceptually shown in FIG. 1, the above object is achieved by the provision of a constant current output driver for emitting a light from a light emitting element by supplying a constant current, the constant current output driver comprising: a constant current output element that outputs a constant current (100); a first switching element (101) disposed between the constant current output element and a power supply (VDD), for electrically connecting and disconnecting the power supply and the constant current output element;

and a first output terminal (102) connected to a current output side of the constant current element with no switching element disposed therebetween.

In the present invention as recited in claim 2, as conceptually shown in FIG. 2, the above object is achieved by the provision of a constant current output driver for emitting alight from a light emitting element by supplying a constant current, the constant current output driver comprising: a constant current output element (100) that outputs a constant current; a first switching element (101) disposed between the constant current output element and a power supply (VDD), for electrically connecting and disconnecting the power supply and the constant current output element; a second switching element (103) connected between current output side of the constant current output element and a second terminal (104), for performing an on/off operation in association with the on/off operation of the first switching element; and a first output terminal (102) connected between the current output side of the constant current output element and the second switching element (103) with no switching element therebetween.

In the present invention as recited in claim 3, as conceptually shown in FIG. 3, the above object is achieved by the provision of a constant current output driver comprising:
 a first field effect transistor (50) for outputting a constant current with the application of a constant voltage (VGC) to a gate thereof;
 a second field effect transistor (40) disposed between the first field effect transistor and a power supply (VDD), for electrically connecting and disconnecting the power supply and the first field effect transistor; and
 A first output terminal (OUT) connected to a current output side of the first field effect transistor with no switching element therebetween.

In the present invention as recited in claim 4, as conceptually shown in FIG. 4, the above object is achieved by the provision of a constant current output driver comprising: a first field effect transistor (50) for outputting a constant current with the application of a constant voltage (VGC) to a gate thereof; a second field effect transistor (40) disposed between the first field effect transistor and a power supply (VDD), for electrically connecting and disconnecting the power supply and the first field effect transistor; a third field effect transistor (70) connected in series with a current output side of the first field effect transistor and having a gate thereof applied with a constant voltage (VGC2) different from the constant voltage which is applied to the gate of the first field effect transistor; and a first output terminal (OUT) connected to a current output side of the third field effect transistor through no switching element.

In the present invention as recited in claim 5, as conceptually shown in FIG. 5, the above object is achieved by the provision of a constant current output driver comprising: a first field effect transistor (50) for outputting a constant current with the application of a constant voltage (VGC) to a gate thereof; a second field effect transistor (40) disposed between the first field effect transistor and a power supply (VDD), for electrically connecting and disconnecting the power supply and the first field effect transistor; a third field effect transistor (60) forming a channel different from that of the second field effect transistor, connected between a current output side of the first field effect transistor and a second terminal (a terminal to which the ground is connected), and having a gate thereof commonly connected to an input terminal (IN) together with a gate of the second field effect transistor; and a first output terminal (OUT) connected between a current output side of the first field effect transistor and the third field effect transistor through no switching element.

In the present invention as recited in claim 6, as conceptually shown in FIG. 7, the above object is achieved by the provision of a constant current output driver comprising: a first field effect transistor (50) for outputting a constant current with the application of a constant voltage (VGC) to a gate thereof; a second field effect transistor (40) disposed between the first field effect transistor and a power supply (VDD), for electrically connecting and disconnecting the power supply and the first field effect transistor; a third field effect transistor (70) connected in series with a current output side of the first field effect transistor and having a gate thereof applied with a constant voltage (VGC2) different from the constant voltage which is applied to the gate of the first field effect transistor; a fourth field effect transistor (60) forming a channel different from that of the second field effect transistor, connected between a current output side of the third field effect transistor and a second terminal (a terminal to which the ground is connected), and having a gate thereof commonly connected to an input terminal (IN) together with a gate of the second field effect transistor; and a first output terminal (OUT) connected between the current output side of the third field effect transistor and the fourth field effect transistor through no switching element.

In the present invention as recited in claim 7, as conceptually shown in FIG. 8, the above object is achieved by the provision of a constant current output driver comprising: a first field effect transistor (50) connected to a power supply (VDD), for outputting a constant current with the application of a constant voltage (VGC) to a gate thereof; a second field effect transistor (40) connected in series with a current output side of the first field effect transistor, for conducting switching operation; a third field effect transistor (70) connected in series with a current output side of the second field effect transistor and having a gate thereof applied with a constant voltage (VGC2) different from the constant voltage which is applied to the gate of the first field effect transistor; a fourth field effect transistor (60) forming a channel different from that of the second field effect transistor, connected between a current output side of the third field effect transistor and a second terminal, and having a gate thereof commonly connected to an input terminal (IN) together with a gate of the second field effect transistor; and a first output terminal (OUT) connected between the current output side of the third field effect transistor and the fourth field effect transistor through no switching element.

In the present invention as recited in claim 8, as conceptually shown in FIG. 9, the above object is achieved by the provision of a constant current output driver comprising: a first field effect transistor (50) connected to a power supply (VDD), for outputting a constant current with the application of a constant voltage (VGC) to a gate thereof; a second field effect transistor (70) connected in series with a current output side of the first field effect transistor and having a gate thereof applied with a constant voltage (VGC2) different from the constant voltage which is applied to the gate of the first field effect transistor; a third field effect transistor (40) connected in series with a current output side of the second field effect transistor for conducting switching operation; a fourth field effect transistor (60) forming a channel different from that of the third field effect transistor, connected between a current output side of the third field effect transistor and a second terminal, and having a gate thereof commonly connected to an input terminal (IN) together with a gate of the second field effect transistor; and a first output terminal (OUT) connected between the current output side of the third field effect transistor and the fourth field effect transistor through no switching element.

In the present invention as recited in claim 9, the above object is achieved by the provision of a constant current output driver comprising: an output terminal (OUT); a first field effect transistor (50) connected between the output terminal and a power supply (VDD), for outputting a constant current with the application of a constant voltage to a gate thereof; switching means (40) connected between the first field effect transistor and the output terminal or the power supply, for electrically connecting and disconnecting the first field effect transistor and the output terminal or the power supply; and a constant voltage applying circuit (31) having a temperature characteristic which changes in the same manner as the temperature characteristic of the first field effect transistor, for applying a constant voltage to the first field effect transistor at a constant temperature.

In the present invention as recited in claim 10, the above object is achieved by the provision of a constant current output driver in the invention of claim 9, the constant voltage applying circuit comprises: a voltage dividing means (R), a second field effect transistor (51) connected in serial between the resistor means and the power supply and having a gate thereof connected in a saturated state, wherein the gate of the second field effect transistor is connected to the gate of the first field effect transistor.

In the present invention as recited in claim 11, the above object is achieved by the provision of a constant current output driver in the invention of claim 10 wherein the first switching means comprises a third field effect transistor (40) having a gate which inputs a switching signal; and wherein there is further provided a fourth field effect transistor (41) which has a gate connected to the ground and is connected to a power supply side or its opposite side of the second field effect transistor in association with a connection position of the first switching means.

In the present invention as recited in claim 12, the above object is achieved by the provision of a constant current output driver in the invention of claim 10 wherein the first field effect transistor and the second field effect transistor are formed of the same standard elements.

In the present invention as recited in claim 13, the above object is achieved by the provision of a constant current output driver in the invention of any one of claims 9 to 12 wherein the resistor means comprises a ladder resistor, a variable resistor, a terminal to which a resistor is externally attached, or a resistor and a terminal to which another resistor is externally attached in parallel to the terminal.

In the present invention as recited in claim 14, the above object is achieved by the provision of a constant current output driver in the invention of any one of claims 9 to 13 wherein a gate of the second field effect transistor is connected to an input of a voltage follower circuit (71), and an output of the voltage follower circuit is connected to a gate of the first field effect transistor.

In the present invention as recited in claim 15, the above fifth object is achieved by the provision of a constant current output driver wherein there are formed, in one integrated circuit, a plurality of output terminals; field effect transistors the number of which is equal to that of the output terminals, which are connected between the output terminals and a power supply and which output a constant current with the application of a given voltage to gates thereof; switching means for electrically connecting and disconnecting the respective field effect transistors and the respective output terminals or the power supply, independently; a first constant current control section that generates a first voltage; a second constant current control section that generates a second voltage; a third constant current control section that generates a third voltage; a first wiring that connects an output of the first constant current control section to every three gates of the plurality of field effect transistors; a second wiring that connects an output of the second constant current control section to the gates of the respective field effect transistors adjacent to the respective field effect transistors to which the first wiring is connected; and a third wiring that connects an output of the third constant current control section to the gates of the respective field effect transistors further adjacent to the respective field effect transistors to which the second wiring is connected.

As described above, according to the present invention, for example, in the case where the constant current output driver is applied to an organic EL panel for color display, three kinds of field effect transistors that output different constant current values and an output terminal are disposed in correspondence with the arrangement order of three kinds of light emitting elements (the respective light emitting elements of R, G and B) which are sequentially connected to the respective anode terminals A1 to A2 arranged in a line. Accordingly, it is unnecessary to provide multi-layer wirings, and the wiring work is simplified. Also, since the multi-layer wirings is unnecessary, it is possible to use the constant current output driver for a display unit such as an organic EL for color display mounted on a COG.

Also, in the present invention as recited in claim 15, the number of the output terminals and the number of the field effect transistors are 192, respectively. In this way, 192 (a common multitude of 3×8) pieces each of the output terminals and the field effect transistors are arranged. As a result, it is possible to make a chip size (for example, 20 mm) suitable for mounting, and the mounting cost can be reduced.

In the present invention as recited in claim 15, there are provided, in the claim 15, a first wiring terminal to which the first wiring is connected, a second wiring terminal to which the second wiring is connected, and a third wiring terminal to which the third wiring is connected. Since the respective first to third wiring terminals are connected in this way, it is possible to monitor the voltage outputted from the first to third constant voltage circuits.

In the present invention as recited in claim 18, there are provided two of the first constant current control sections, two of the second constant current control sections and two of the third constant current control sections, respectively; wherein the first wiring includes a first voltage wiring that connects both the outputs of two first constant current control sections to each other, and a first gate wiring that connects the first voltage wiring and the respective gates; wherein the second wiring includes a second voltage wiring that connects both the outputs of two second constant current control sections to each other, and a second gate wiring that connects the second voltage wiring and the respective gates; and wherein the third wiring includes a third voltage wiring that connects both the outputs of two third constant current control sections to each other, and a third gate wiring that connects the third voltage wiring and the respective gates.

Since there are provided two first constant current control section, two second constant current control section and two third constant current control section as described above, it is possible to adjust the inclination of a change in the voltage applied to the respective field effect transistors.

Also, in the present invention, a resistor is disposed on a voltage wiring between at least one pair of gate wirings. In this case, the voltage wiring can be formed of a polysilicon resistor.

Also, in the present invention as recited in claim 21, there are formed, in one integrated circuit, a plurality of output terminals; field effect transistors the number of which is equal to that of the output terminals, which are connected between the output terminals and a power supply and which output a constant current with the application of a given voltage to gates thereof; switching means for electrically connecting and disconnecting the respective field effect transistors and the respective output terminals or the power supply, independently; first, second and third voltage input terminals to which a voltage is applied; first, second and third voltage output terminals from which the voltage is outputted; a first voltage wiring that connects the first voltage input terminal and the first voltage output terminal; a second voltage wiring that connects the second voltage input terminal and the second voltage output terminal; a third voltage wiring that connects the third voltage input terminal and the third voltage output terminal; a first gate wiring that connects the first voltage wiring to every three gates of the plurality of field effect transistors; a second gate wiring that connects the second voltage wiring to the gates of the respective field effect transistors adjacent to the respective field effect transistors to which the first wiring is connected; and a third gate wiring that connects the third voltage wiring to the gates of the respective field effect transistors further adjacent to the respective field effect transistors to which the second wiring is connected.

As the piezoelectric input terminal to which a voltage is applied is provided as described above, the first voltage, the second voltage and the third voltage applied to the gates of the field effect transistors can be applied from the exterior of the constant current output driver. In addition, since the voltage output terminals from which the voltage is outputted are provided, it is possible to sequentially connect a plurality of constant current output drivers. Also, the first voltage, the second voltage and the third voltage can be applied from the voltage output terminal, and since there is provided a difference between the applied voltage from the voltage input terminal and the applied voltage from the voltage output terminal, it is possible to adjust the inclination of a change in the voltage applied to the respective field effect transistors.

In the present invention, there may be used the voltage supply device of the constant current output driver in which there is formed, in one integrated circuit, a first constant current control section that generates the first voltage, a second constant current control section that generates the second voltage, a third constant current control section that generates the third voltage, a first terminal to which the output of the first constant current control section is connected, a second terminal to which the output of the second constant current control section is connected, and a third terminal to which the output of the third constant current control section is connected, and the first, the second and the third terminals are connected to the first, the second and the third voltage input terminals to apply a voltage.

DETAILED DESCRIPTION OF THE PREFERRED EMBODIMENTS

Hereinafter, a description will be given in detail of a preferred first embodiment mode in a constant current output driver according to the present invention with reference to FIGS. 2, 5 and 6.

Figure 5:
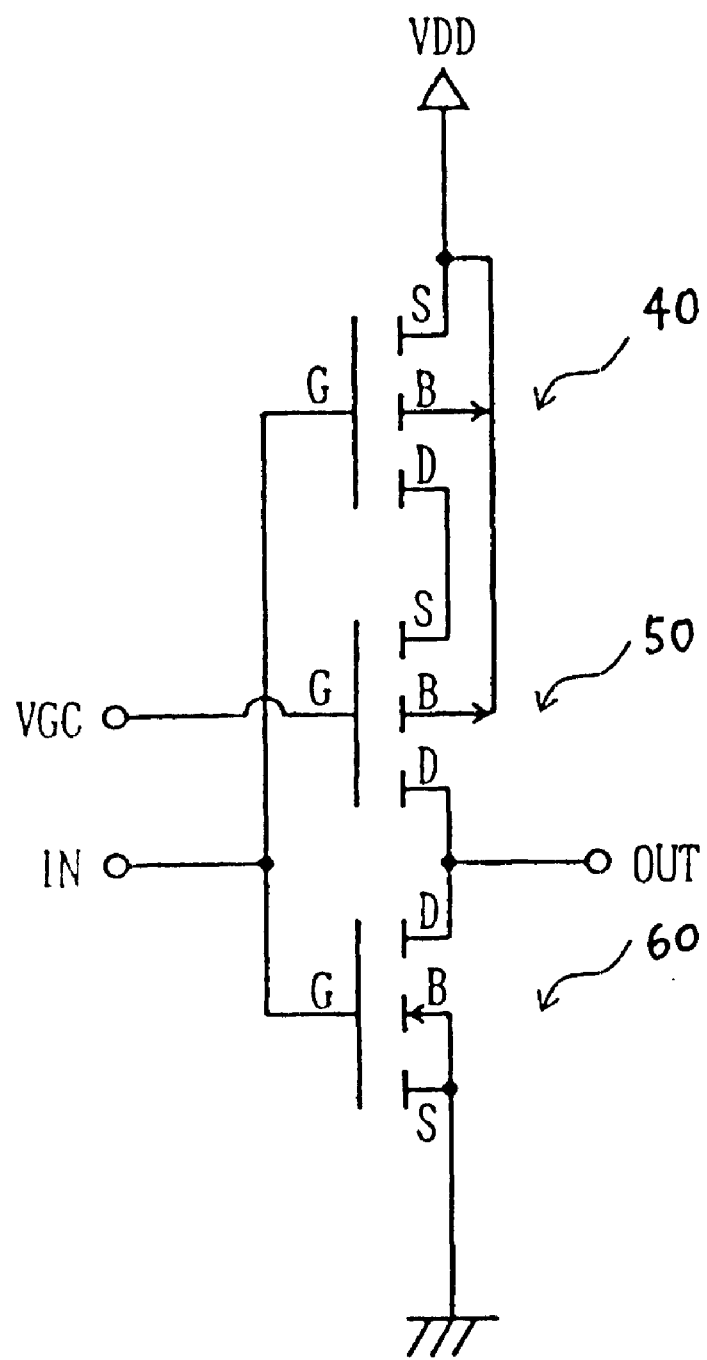
FIG. 5 is a structural diagram showing an example corresponding to claim 5 of the present invention and a structural diagram of a first embodiment mode corresponding to the respective inventions.

FIG. 5 shows the circuit structure of a constant current output driver.

Figure 22:
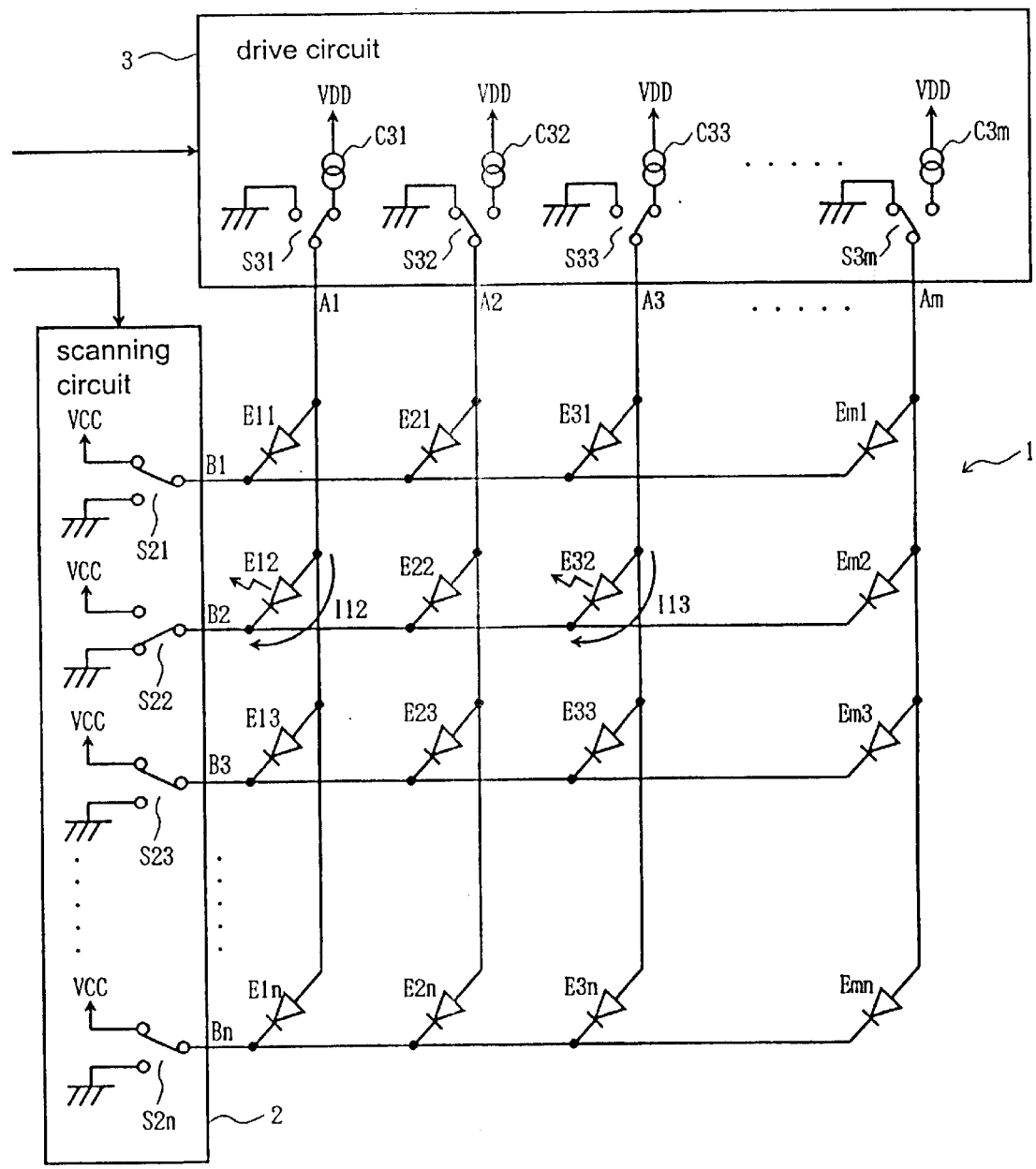
FIG. 22 shows the structure of a conventional display unit using an organic EL.

The constant current output driver according to this embodiment mode can be applied to a driver for an LED panel and other devices that require the constant current drive, and in particular, is effective to a case in which an organic EL panel shown in FIG. 22 with a problem of a difference in the wiring resistance within the panel is employed.

As shown in FIG. 5, the constant current output driver according to this embodiment mode includes a constant current FET 50 formed of a p-channel MOSFET, a switch FET 40 formed of a p-channel MOSFET and a switch FET 60 formed of an n-channel MOSFET. The constant current FET 50 and the switch FETs 40 and 60 are formed of the enhancement MOSFET, respectively.

A source S of the switch FET 40 is connected to a power supply VDD (30 V in this embodiment mode), a drain D of the switch FET 40 and a source S of the constant current FET 50 are connected to each other, and both of a drain D of the constant current FET 50 and a drain D of the switch FET 60 are connected to an output terminal OUT. A source S of the switch FET 60 and a substrate B are connected to the ground. Because a constant voltage (VGC) is applied to a gate G of the constant current FET 50, the FET 50 outputs a constant current in a saturation operating range.

Both of a gate G of the switch FET 40 and a gate G of the switch FET 60 are connected to an input terminal IN. With this structure, the switch FET 60 conducts the off/on operation in association with the on/off operation of the switch FET 40. A constant gate voltage VGC is always applied to the gate G of the constant current FET 50 in order to make the constant current FET 50 function as the constant current element.

A substrate B of the. switch FET 60 is connected to the ground commonly together with the source S.

Also, the substrate B of the constant current FET 50 and the substrate B of the switch FET 40 are connected to the power supply VDD together. As a result, the substrate potential of both the substrates B of the constant current FET 50 and the switch FET 40 are common to each other and also common to the source potential of the constant current FET 40.

The drive circuit 3 is formed of m constant current output drivers thus structured, and the organic EL display unit is structured by connecting the respective constant current output drives to the anode lines A1 to Am.

In the above constant current output driver, in a state where an H (high) level signal is supplied from the input terminal IN, the p-channel switch FET 40 comes to an off-state because no channel is formed, and the constant current FET 50 and the power supply VDD are electrically separated from each other. Therefore, no current flows in the output terminal OUT. On the other hand, in the case where the input terminal IN is of the H level, because the n-channel switch FET 60 is formed with a channel and comes to an on-state, the output terminal OUT is connected to the ground through the switch FET 60.

Then, when the switching signal is changed over and an L (low) level signal is supplied from the input terminal IN, the channel of the switch FET 60 disappears and is electrically separated from the output terminal OUT. Also, a channel is formed in the switch FET 40, and the power supply VDD and the constant current FET 70 are connected to each other. As a result, a constant current is supplied to the output terminal OUT from the power supply VDD through the constant current FET 70.

Figure 6:
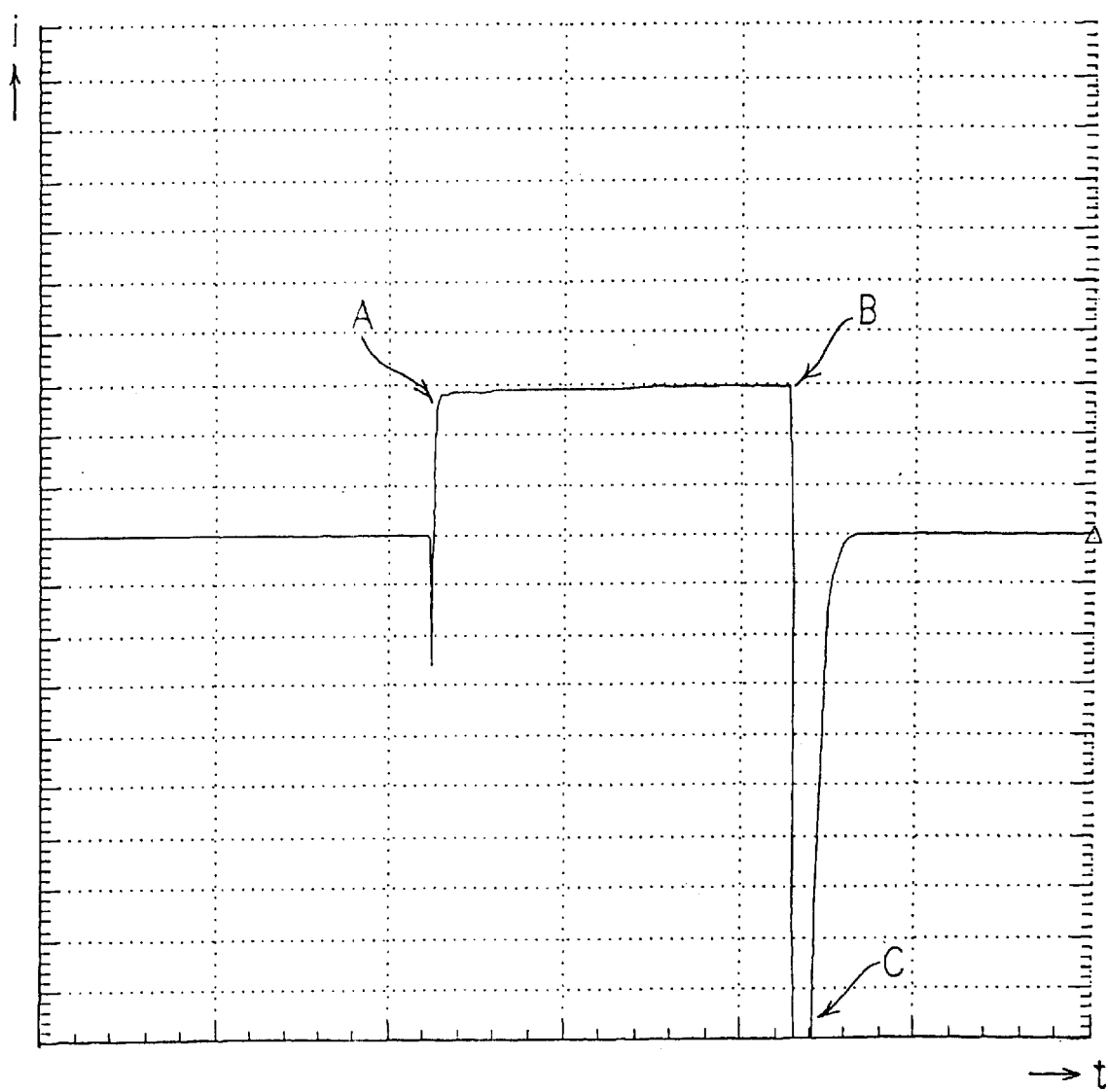
FIG. 6 is an explanatory diagram showing the simulation result of a constant current output driver having the structure of FIG. 5.

FIG. 6 shows the simulation result of an output current in the constant current output driver in accordance with this embodiment mode. In the figure, the axis of abscissa is a time t whereas the axis of ordinate is a current value I of the output terminal OUT.

As shown in FIG. 6, according to the constant current output driver of this embodiment mode, over-shoot does not occur in a moment when the switch FET 40 and the switch FET 60 turn on and off as indicated by arrows A and B.

The current in a minus direction indicated by an arrow C shown in FIG. 6 is obtained by discharging the charges stored in the capacity component of an organic EL connected to the output terminal OUT to the ground as in the arrow C of FIG. 24 and is not over-shoot (the same is applied to the simulation result shown in FIG. 11 which will be described later).

As shown in FIG. 6, according to the constant current output driver with the structure shown in FIG. 5, the occurrence of over-shoot is prevented for the following reasons.

In the constant current output driver according to this embodiment mode, no switching element exists between the constant current FET 50 and the output terminal OUT, and the switch FET 40 is connected to the power supply VDD side rather than the constant current element 50. For that reason, even if over-shoot occurs in the output current of the switch FET 40 due to the on/off operation of the switch FET 40, since the constant current FET 50 is disposed between the output terminal OUT and the switch FET 40, constant current with no over-shoot is outputted to the output terminal OUT. In this example, the over-shoot is directed to a current that flows through the capacitor of the gate insulating film of the switch FET 40.

Also, in the constant current output driver according to this embodiment mode, since the substrate B of the constant current FET 50 is connected to the power supply VDD, even if the switch FET 40 turns on/off, the potential of the substrate B of the constant current FET 50 does not fluctuate and is kept constant. For that reason, the constant current FET 50 can stably output the constant current from the output terminal OUT without being adversely affected by the operation of the switch FET 40.

In addition, in the constant current output driver according to this embodiment mode, since the substrate B of the constant current FET 50 and the substrate B of the switch FET 40 are common to each other, if a well is commonly used, the chip size can be reduced.

However, in the constant current output driver with the structure shown in FIG. 5, in order to reduce the output terminal OUT voltage dependency change of the constant current value, it is necessary to increase the gate length of the constant current FET 50 with such a problem that the IC chip size increases. Also, because the constant current FET 50 is directly connected to the output terminal OUT which is large in voltage fluctuation due to switching, there arises such a problem that the gate voltage VGC of the constant current FET fluctuates with receiving an influence of switching, and the constant current value fluctuates.

Figure 2:
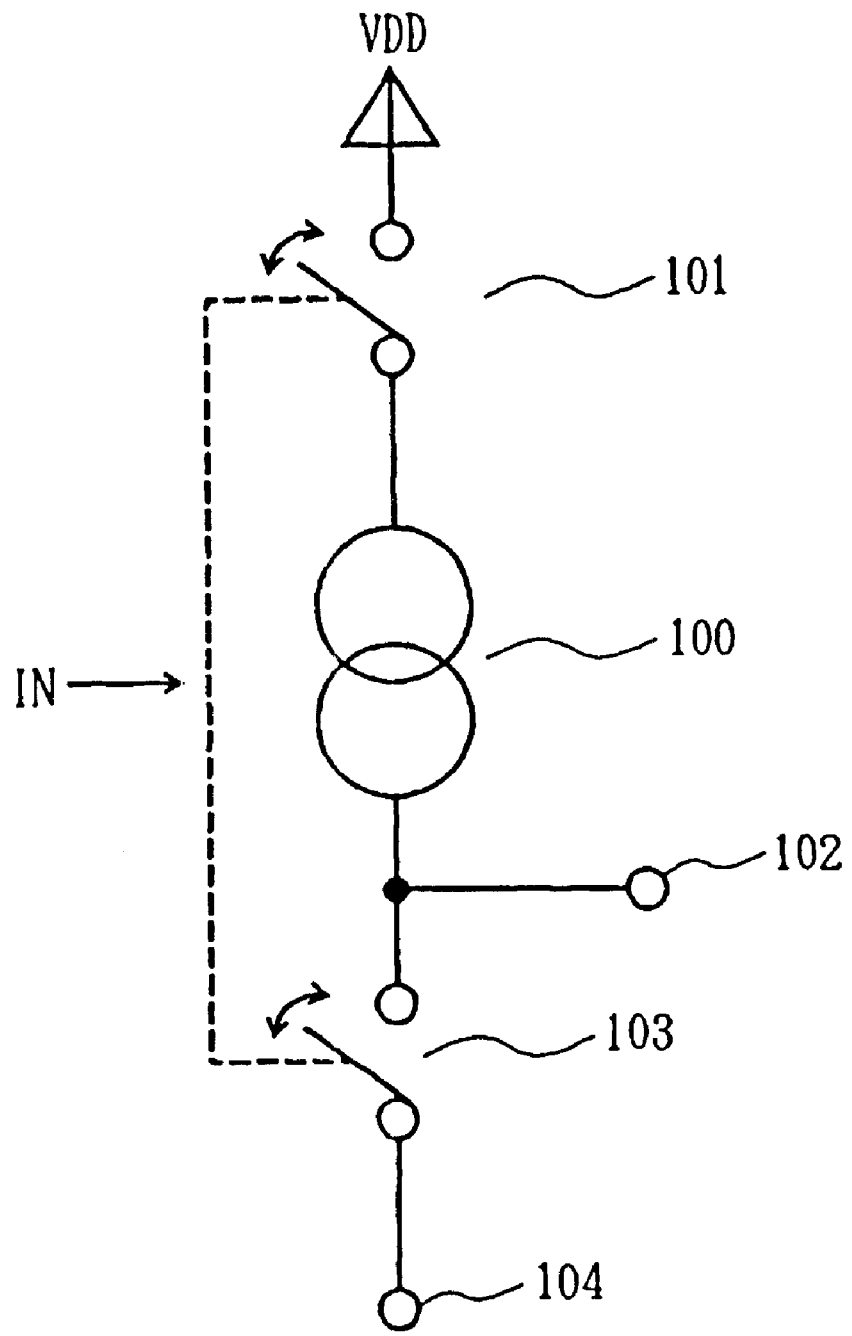
FIG. 2 is a conceptual diagram corresponding to claim 2 of the present invention.

FIG. 2 is a conceptual diagram showing the MOSFET shown in FIG. 5 being represented by a constant current element 100, a switch 101 and a switch 103. As shown in FIG. 2, the first embodiment mode can be realized by another element instead of the MOSFET. However, for the reasons such as the low power consumption, downsizing is easy and the controllability of the constant current which will be described below is facilitated, the structure shown in FIG. 5 is more desirable.

Figure 3:
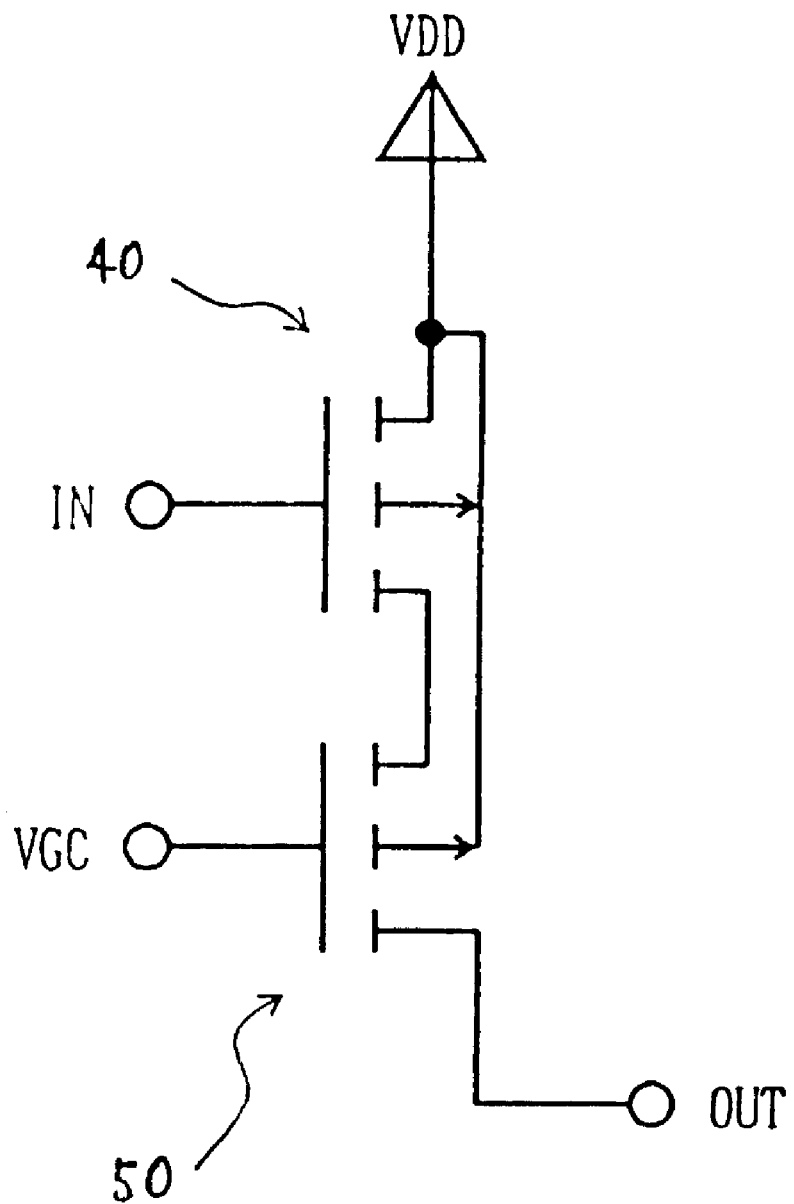
FIG. 3 is a structural diagram showing an example corresponding to claim 3 of the present invention.

FIG. 3 is a structural diagram showing a structure in which the switch FET 60 and the ground are removed from FIG. 5. Even in the structure shown in FIG. 3, it is possible to provide the constant current output without over-shoot as in the case of FIG. 5. In the case of driving the organic EL panel, since it is necessary that the potential of the output terminal OUT drops to the ground, the structure shown in FIG. 5 is desirable.

Figure 1:
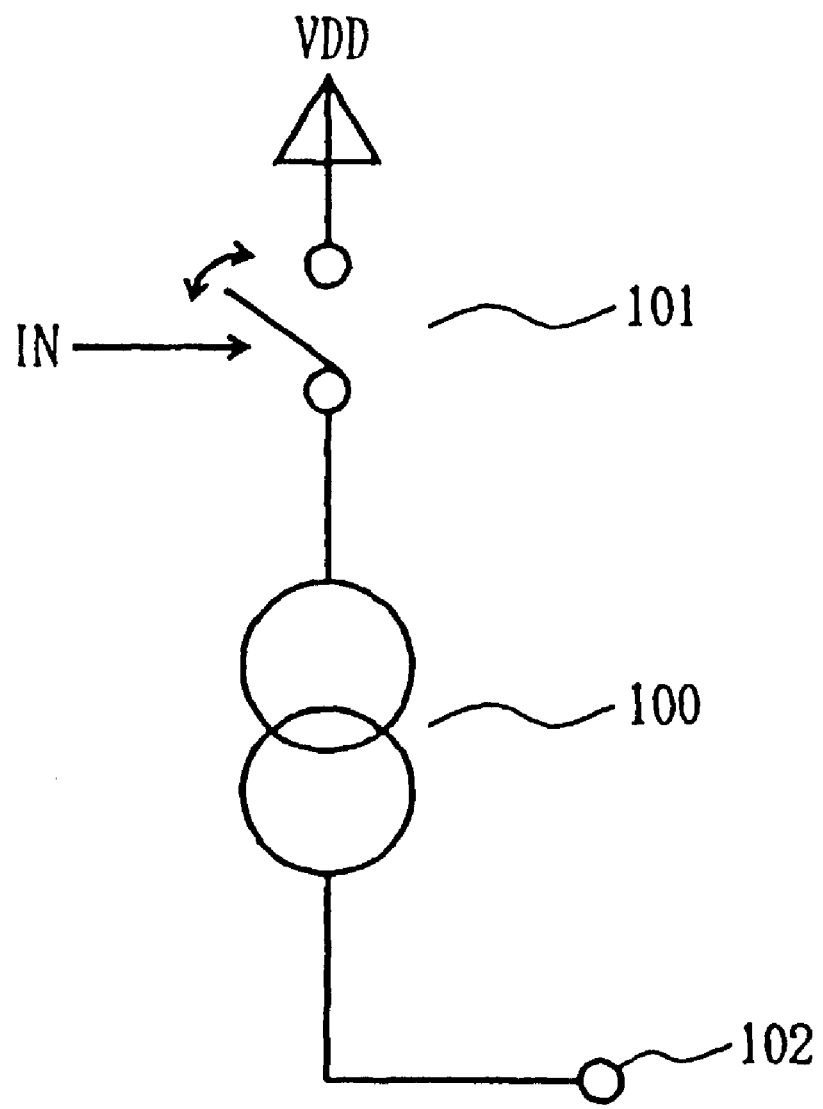
FIG. 1 is a conceptual diagram corresponding to claim 1 of the present invention.

FIG. 1 is a conceptual diagram showing the MOSFET shown in FIG. 3 being represented by the constant current element 100 and the switch 101. For the same reasons as those in the case of FIG. 2, the structure of FIG. 3 is more desirable than that of FIG. 1.

Figure 4:
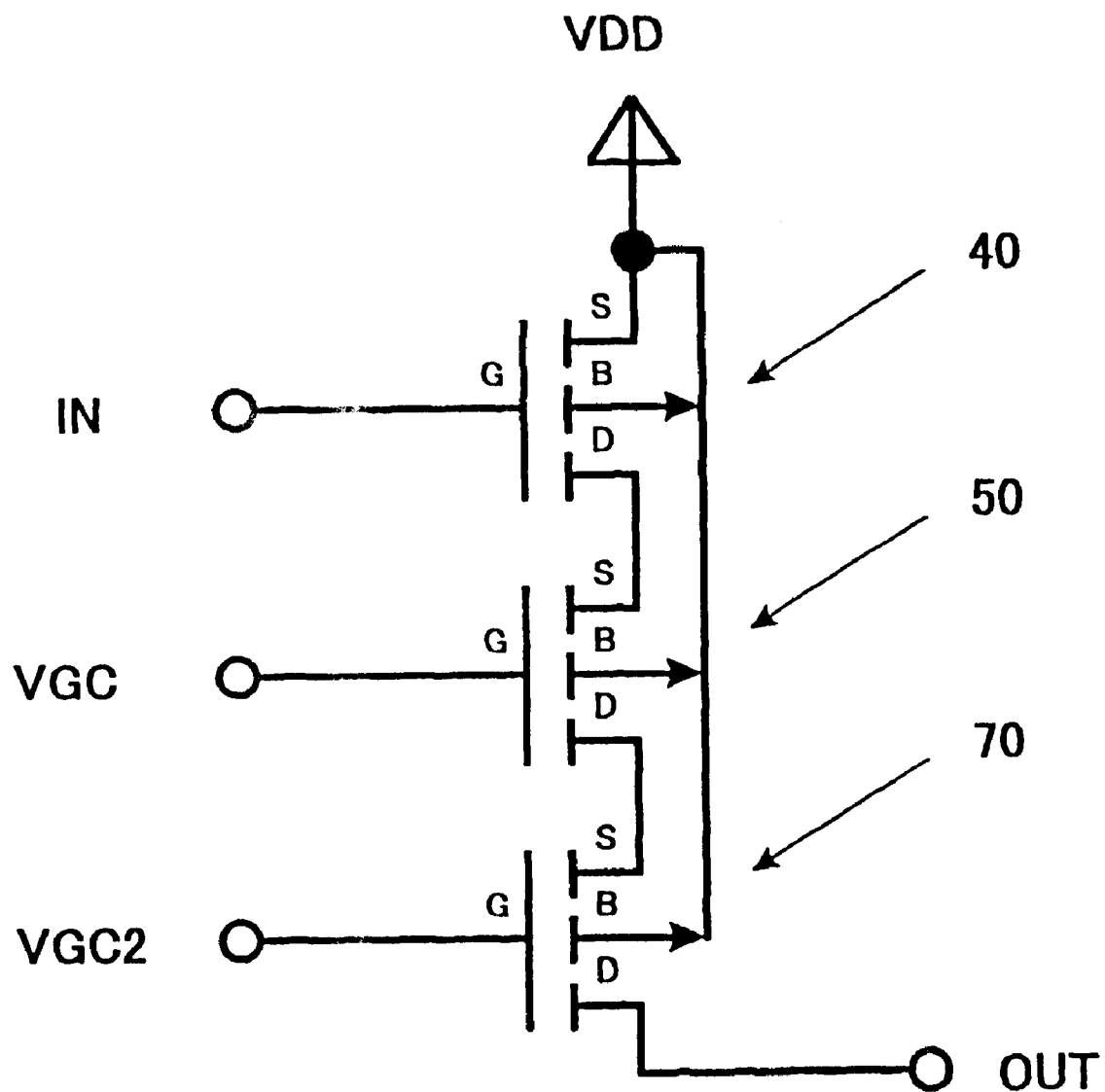
FIG. 4 is a structural diagram showing an example corresponding to claim 4 of the present invention.

FIG. 4 shows the structure in which an FET 70 is connected in series between the constant current FET 50 shown in FIG. 3 and the output terminal OUT. A constant voltage (VGC) is applied to the gate of the constant current FET 50, and a constant voltage (VGC2) different from the gate voltage of the constant current FET 50 is applied to the gate of the FET 70. In this example, the VGC 2 is so set as to provide a difference from VGC to the degree that the FET 70 conducts saturation operation.

With the above-described structure shown in FIG. 4, the FET 70 is subjected to cascade-connection and even in the case where a voltage between the source S of the FET 50 and the drain D of the FET 70 largely changes, a voltage between the source S and the drain D of the FET 50 hardly changes. Accordingly, the output terminal OUT voltage dependency change of the output constant current value becomes very small as compared with the structure shown in FIG. 3.

In the structure shown in FIG. 4, it is desirable that the channel width/channel length of the constant current FET 50 are made identical with the channel width/channel length of the FET 70. In the case where the above values are made identical, if the VGC and the VGC2 are set so that the ratio of VGC-VDD-(threshold voltage of FET 50) and VGC2-VDD-(threshold voltage of FET 70) becomes 1:2, the FET 70 always conducts saturation operation, and a change in the output constant current value of the constant current FET 50 depending on the output terminal OUT voltage becomes very small. Also, the output terminal OUT voltage range which can output the constant current becomes maximum. In addition, it becomes easy to set the voltage of VGC and VGC2.

Figure 7:
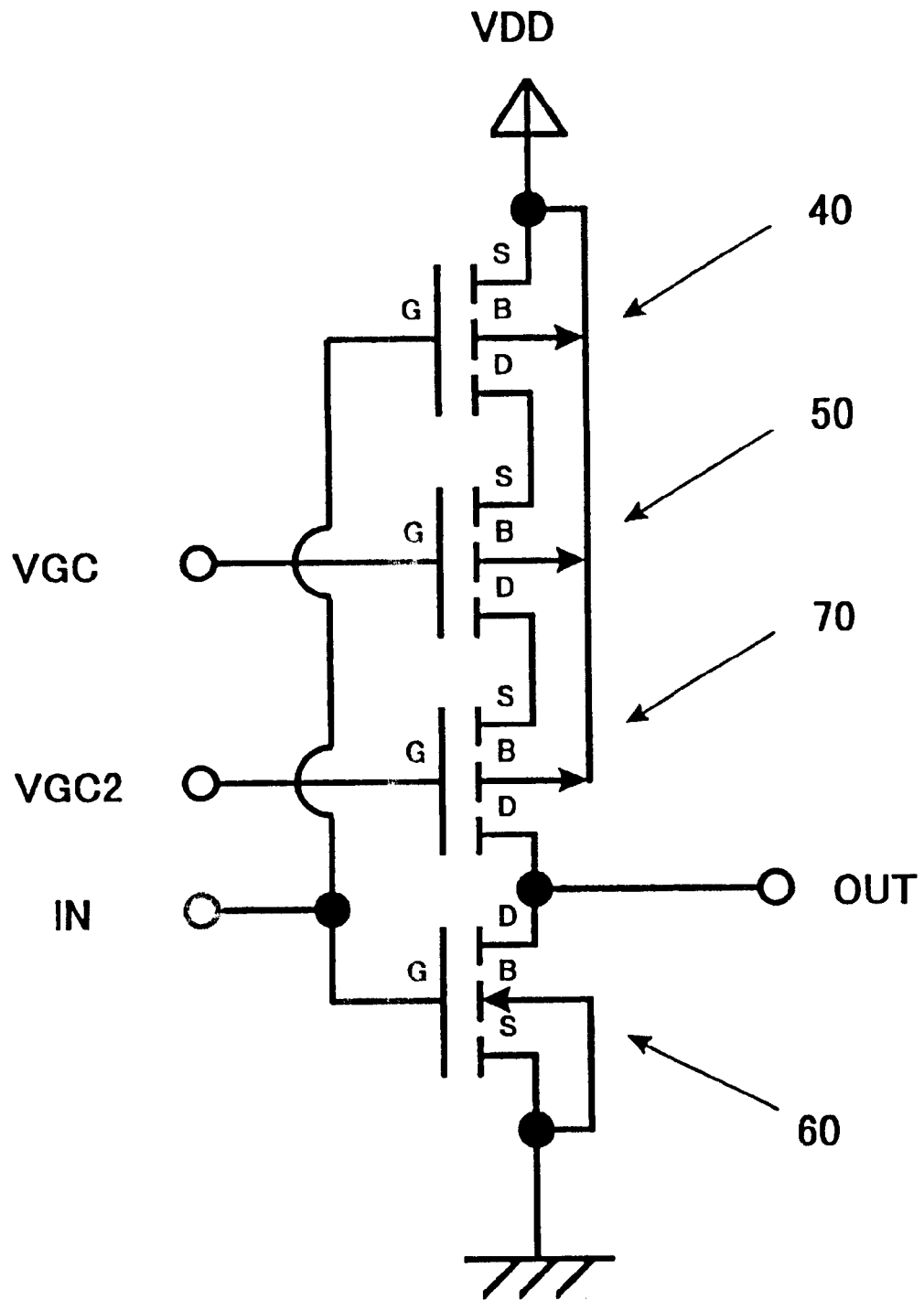
FIG. 7 is a structural diagram showing an example corresponding to claim 6 of the present invention.

FIG. 7 shows the structure in which the switch FET 70 is connected in series between the constant current FET 50 shown in FIG. 5 and the output terminal OUT. A constant voltage (VGC) is applied to the gate of the constant current FET 50, and a constant voltage (VGC2) different from the gate voltage of the constant current FET 50 is applied to the gate of the FET 70. In this example, the VGC 2 is so set as to provide a difference from VGC to the degree that the FET 70 conducts saturation operation.

The structure shown in FIG. 7 is suitable for driving of the organic EL panel since it has a function that outputs the ground to the output terminal OUT. Also, if the channel width/channel length of the constant current FET 50 are made identical with the channel width/channel length of the FET 70, as in the above case of FIG. 4, a change of the output constant current value depending on the output terminal OUT voltage becomes very small and the output terminal OUT voltage range which can output the constant current becomes maximum. Therefore, the structure of FIG. 7 is very suitable for driving of the organic EL panel in which a difference in the wiring resistance within the panel is largely effected.

Also, in the structure of FIG. 7, no over-shoot of the output constant current value occurs as in the case of FIG. 5. In addition, because the constant current FET 50 is connected to the output terminal OUT large in voltage fluctuation due to switching through the FET 70, the gate voltage VGC of the constant current FET is hardly affected by switching.

Figure 8:
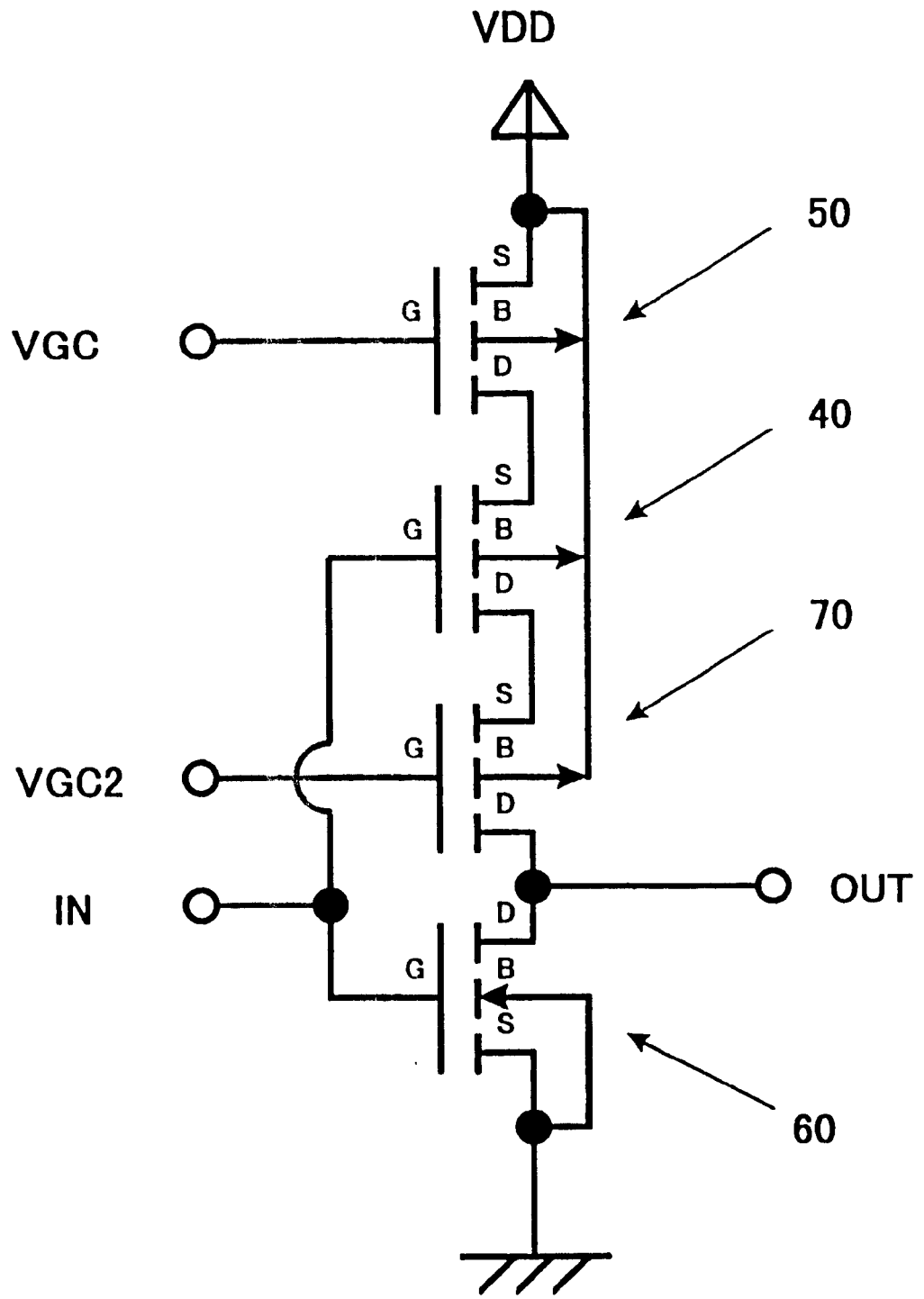
FIG. 8 is a structural diagram showing an example corresponding to claim 7 of the present invention.

The structure of FIG. 8 is stated below. The power supply VDD is connected with the source S of the constant current FET 50, the drain D of the constant current FET 50 is connected with the source of the switch FET 40, the drain D of the constant current FET 50 is connected with the source S of the FET 70, and both of the drain D of the FET 70 and the drain D of the switch FET 60 are connected to the output terminal OUT. The source S of the switch FET 60 and the substrate B are connected to the ground. Other structures are the same as those in FIG. 7.

With the above-described structure, because the source S of the constant current FET 50 is directly connected to the power supply VDD, a difference in voltage between VGC and VDD becomes high in accuracy, and the accuracy in the output constant current value also becomes high. Also, since the constant current FET 50 and the FET 70 are connected in series, a change of the output constant current value depending on the output terminal OUT voltage becomes very small as in the case of FIG. 7. In addition, because the FET 70 acts in the same manner as that of the constant current FET 50, over-shoot of the output current is larger than that in FIG. 7 but prevented to some degree. Also, the gate voltage VGC of the constant current FET 50 is hardly affected by switching as in FIG. 7.

However, since the switch FET 40 exists between the constant current FET 50 and the FET 70, it is necessary to increase a difference in voltage between VGC and VGC2 more than the above-described case of FIG. 7, and therefore there arises such a defect that the output terminal OUT voltage range that can output the constant current is narrower than that of FIG. 7 as much.

Figure 9:
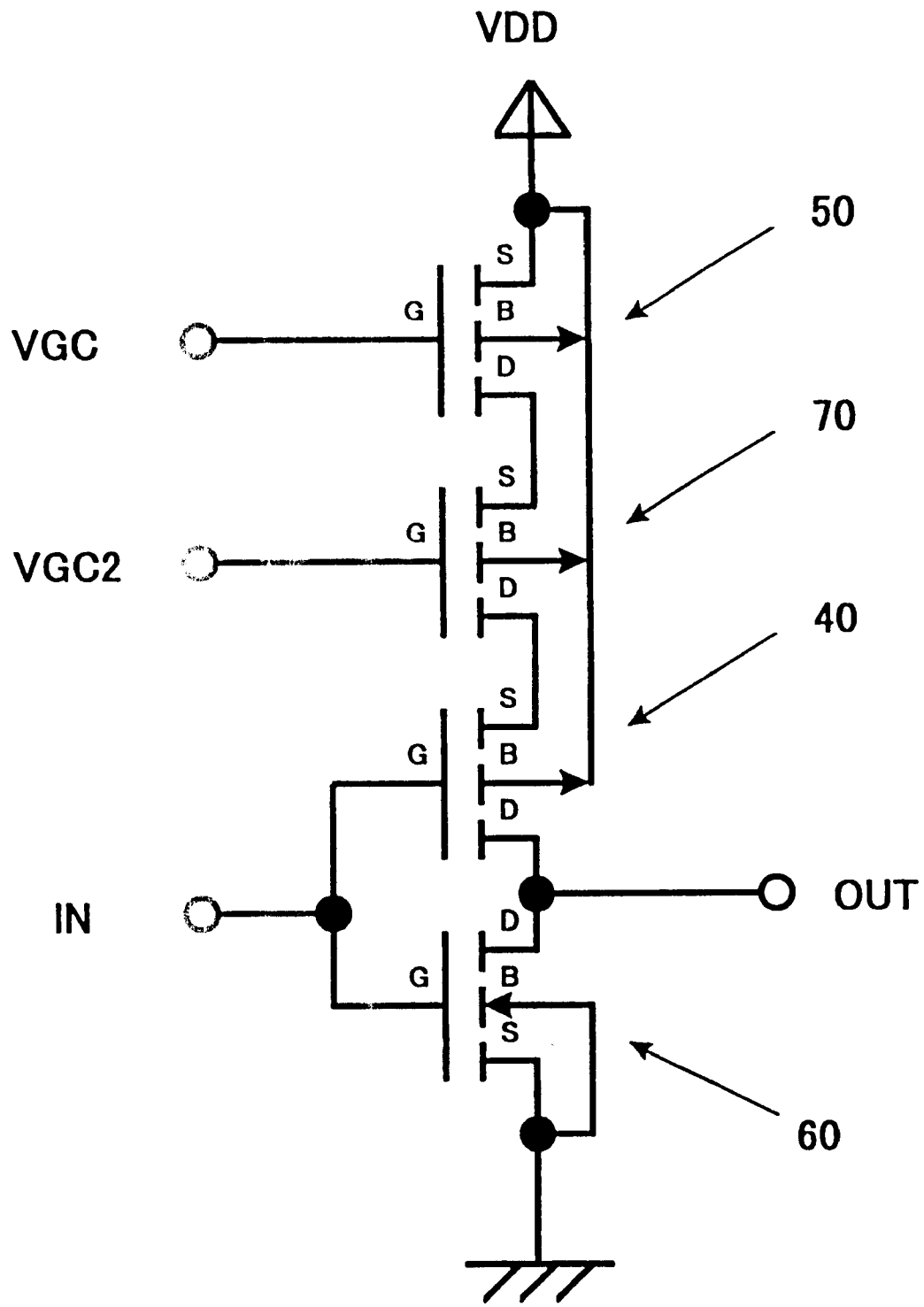
FIG. 9 is a structural diagram showing an example corresponding to claim 8 of the present invention.

The structure of FIG. 9 is stated below. The power supply VDD is connected with the source S of the constant current FET 50, the drain D of the constant current FET 50 is connected with the source S of the FET 70, the drain D of the FET 70 is connected with the source of the switch FET 40. Also, both of the drain D of the switch FET 40 and the drain D of the switch FET 60 are connected to the output terminal OUT. The source S of the switch FET 60 and the substrate B are connected to the ground. Other structures are the same as those in FIG. 7.

With the above-described structure, the output constant current value becomes high in accuracy as in the case of FIG. 8. Also, since the constant current FET 50 and the FET 70 are connected in series, a change of the output constant current value depending on the output terminal OUT voltage becomes very small as in the case of FIG. 7. In addition, the FET 50 is not directly connected to the output terminal OUT and also is not directly connected to both of the FET 40 and the FET 60 which conduct switching. For that reason, it is difficult that the VGC voltage is affected by switching as compared with the structures of FIGS. 7 and 8.

Subsequently, a second embodiment mode of the constant current output driver will be described.

Figure 10:
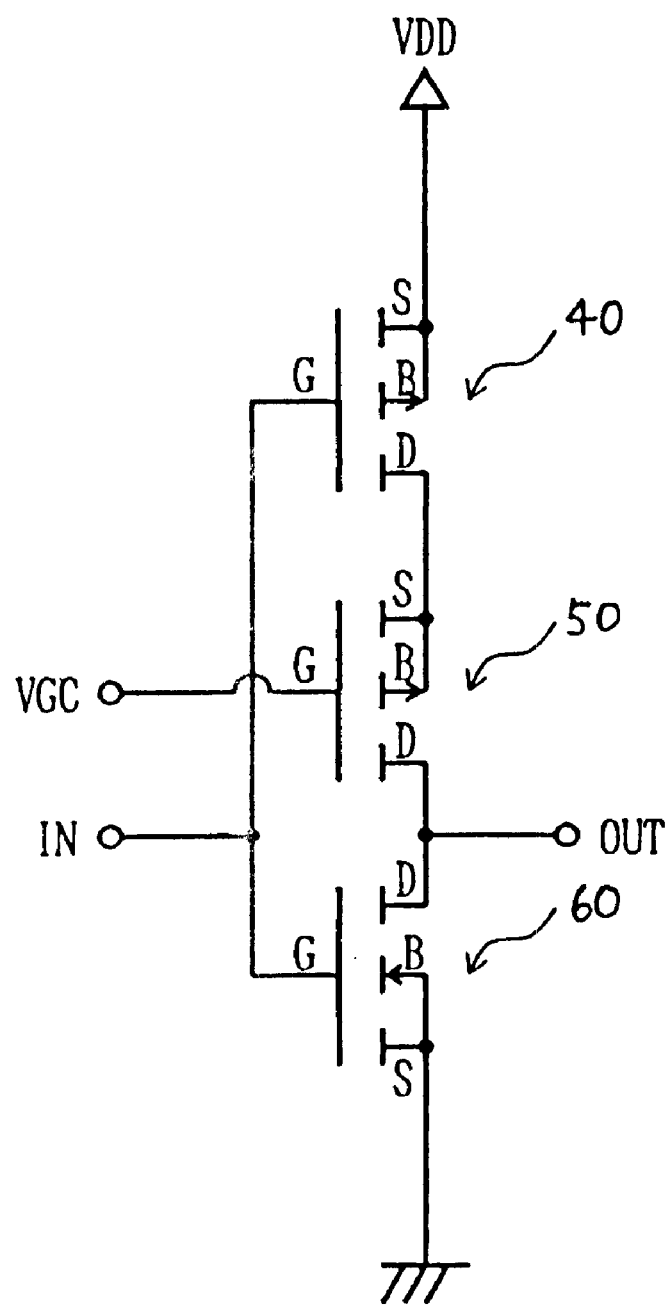
FIG. 10 is a structural diagram of a second embodiment mode of the present invention.

FIG. 10 is a diagram showing the circuit structure of a constant current output driver in accordance with the second embodiment mode.

As shown in FIG. 10, the constant current output driver according to the second embodiment mode is so modified as to connect the substrates B of the respective FETs shown in FIG. 5 to the respective sources S, and other structures are identical with the case of the first embodiment mode shown in FIG. 5.

Figure 11:
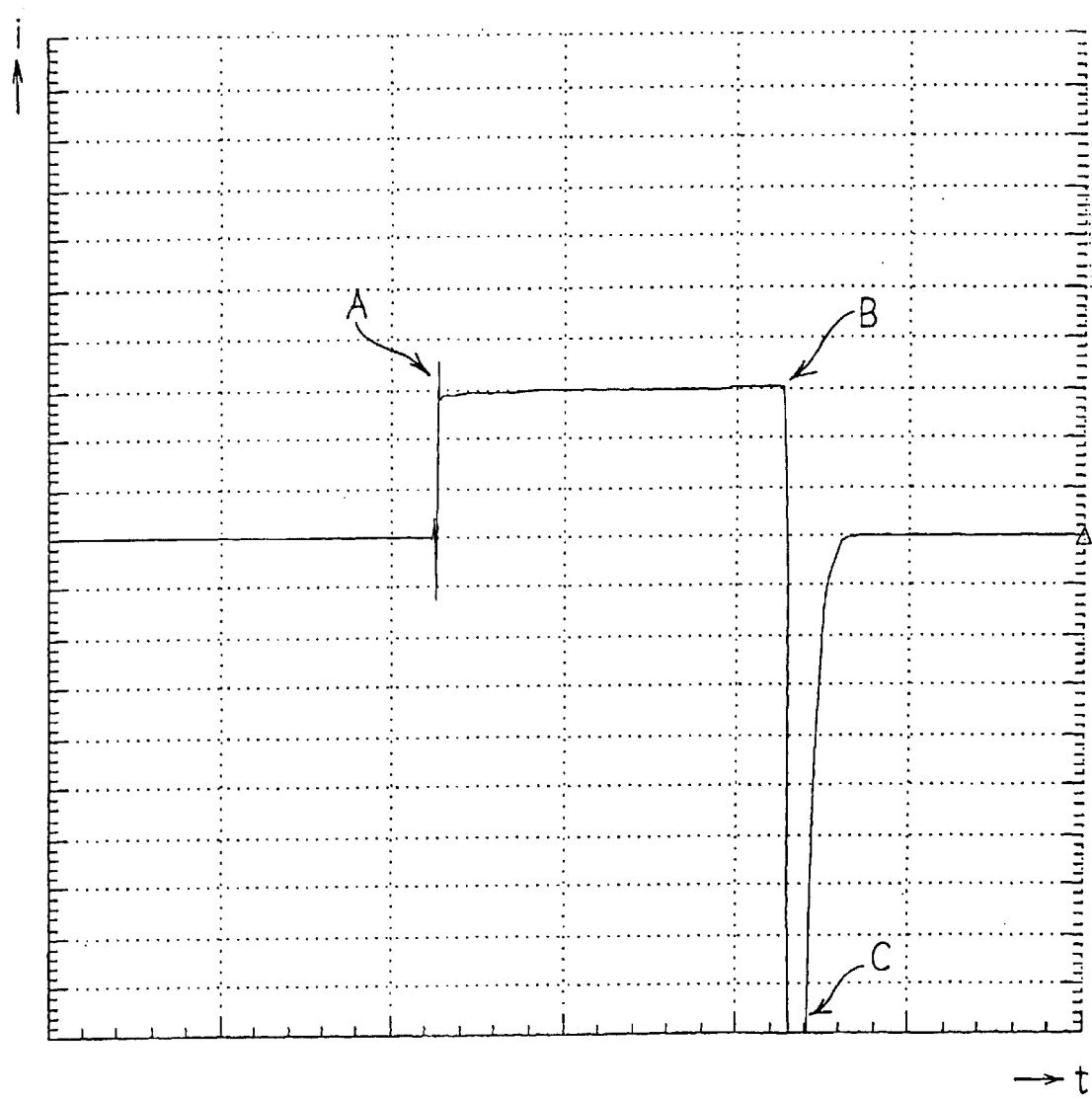
FIG. 11 is an explanatory diagram showing the simulation result of a constant current output driver having the structure of FIG. 10.

FIG. 11 shows the simulation result of an output current in the constant current output driver shown in FIG. 10 in accordance with the second embodiment mode.

Figure 24:
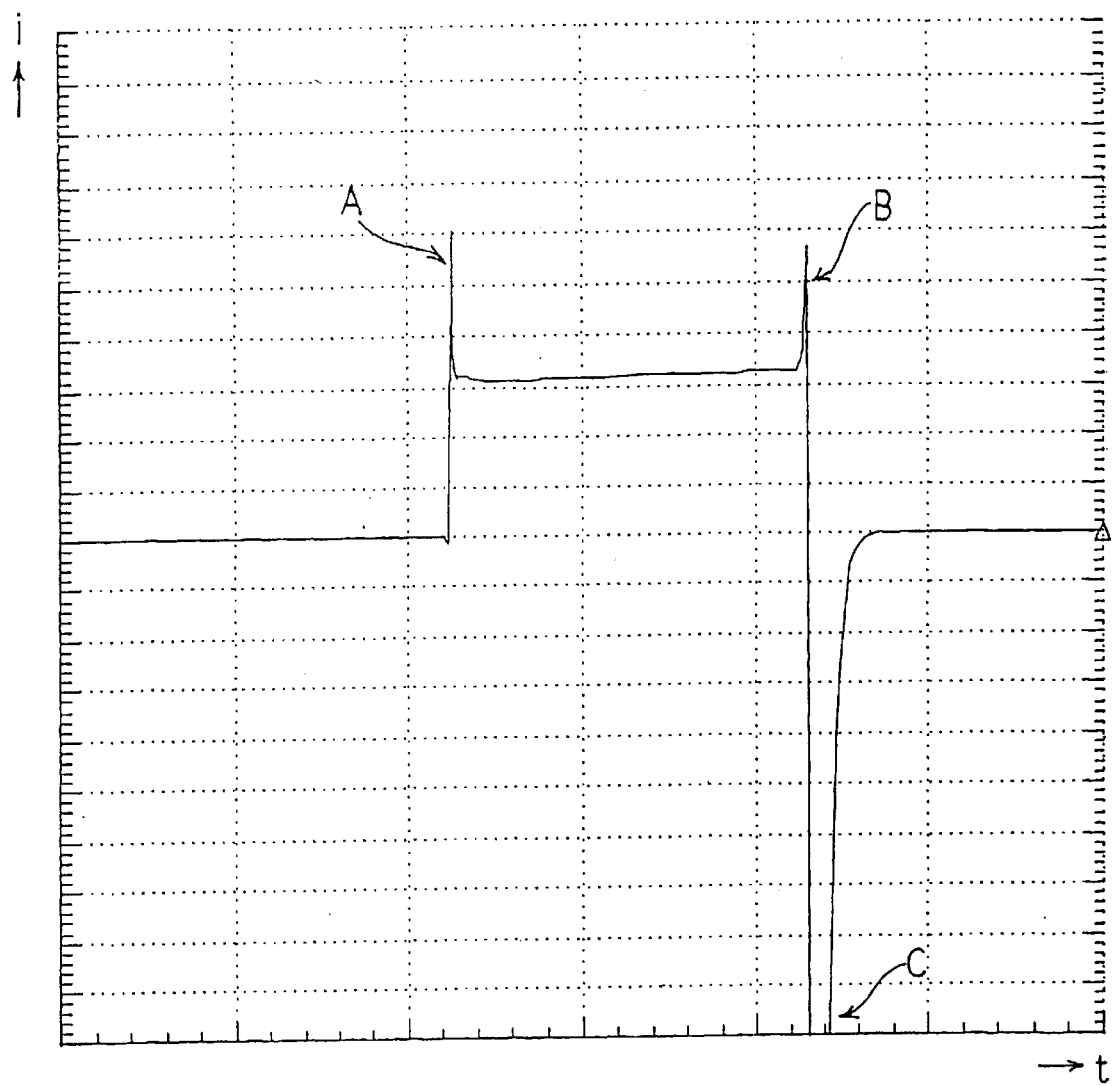
FIG. 24 is an explanatory diagram showing the simulation result of a constant current output driver having the structure of FIG. 22.

As shown in FIG. 11, according to the constant current output driver of this embodiment mode, over-shoot occurs as indicated by an arrow A in a moment when the switch FET 40 turns on but is suppressed to ¼ or less as compared with over-shoot indicated by the arrow A in FIG. 24. Also, over-shoot does not occur as indicated by the arrow in a moment when the switch FET 40 turns off.

Figure 23:
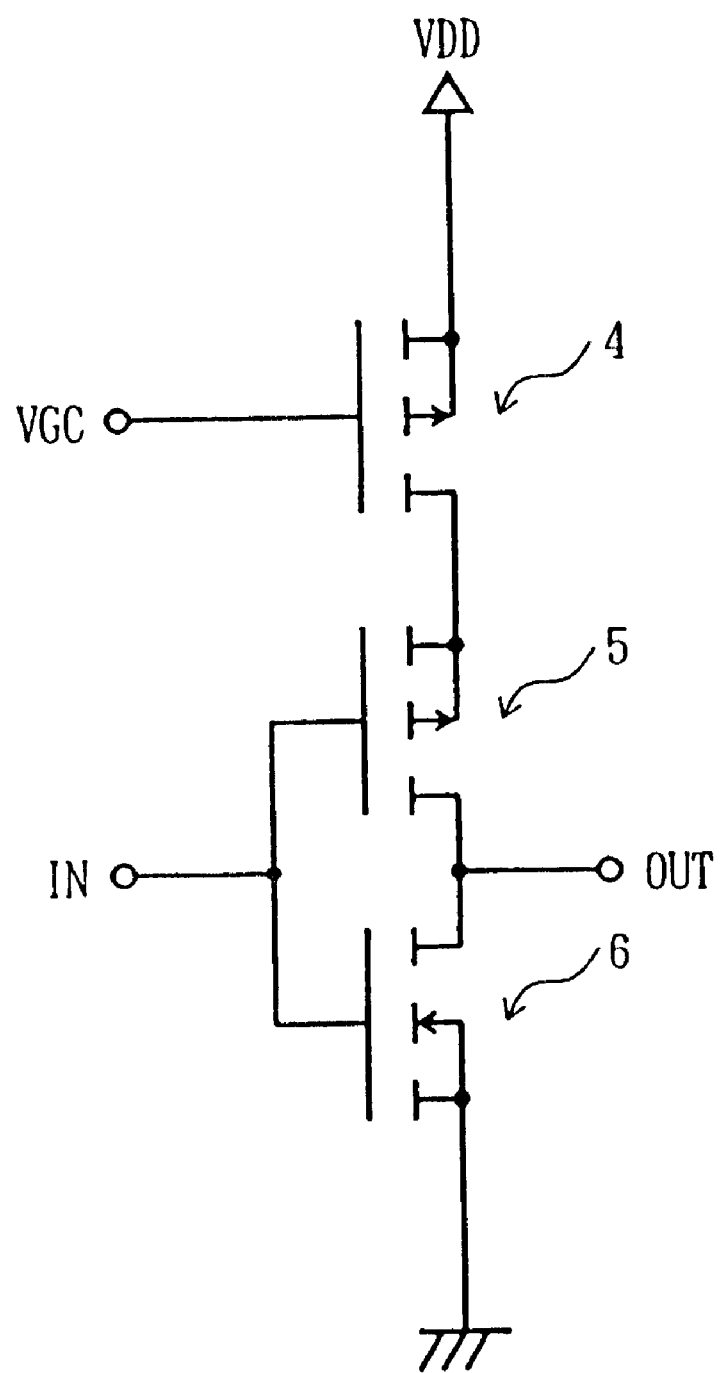
FIG. 23 is a structural diagram proposed in a case where the conventional constant current output driver is formed of an enhancement MOSFET.

In the structure of FIG. 10, the reason why small over-shoot indicated by the arrow A in FIG. 23 occurs although the constant current FET 50 exists between the switch FET 40 and the output terminal OUT as in the case of FIG. 7 is that a current flows through the capacity component between the substrate B and drain D of the constant current FET 50. That component is directed to minus in the arrow B of FIG. 23.

As described above, the structure of FIG. 11 is inferior to that of FIG. 7 in that the over-shoot of the output current slightly occurs. However, in the case where it is necessary to take the potential of the substrate B for each FET without forming a well as in the case where the driver is formed on the SOI substrate, since the wiring from the substrate B is merely connected to the source close to the substrate B without drawing the wiring to VDD or the ground far from the substrate B, there is an advantage in which the chip area can be reduced.

As described above, similarly, in the second embodiment mode, since the switch FET 40 is disposed between the constant current FET 70 and the power supply VDD without disposing the switch element between the constant current FET 50 and the output terminal OUT, the occurrence of over-shoot can be suppressed.

The above description is given of the constant current output driver in the first embodiment mode and the second embodiment mode. However, the present invention is not limited to those structures, and various modifications are enabled in the scope of the invention recited in the claims. For example, in the embodiment mode, the constant current output drive functions as the constant current element by applying the constant voltage VGC to the gate G of the enhancement p-channel MOSFET. Also, the constant current output drive may function as the constant current element by using the enhancement n-channel MOSFET or by using the depletion MOSFET.

Subsequently, a third embodiment mode of the present invention will be described in detail with reference to FIGS. 12 and 13.

Figure 12:
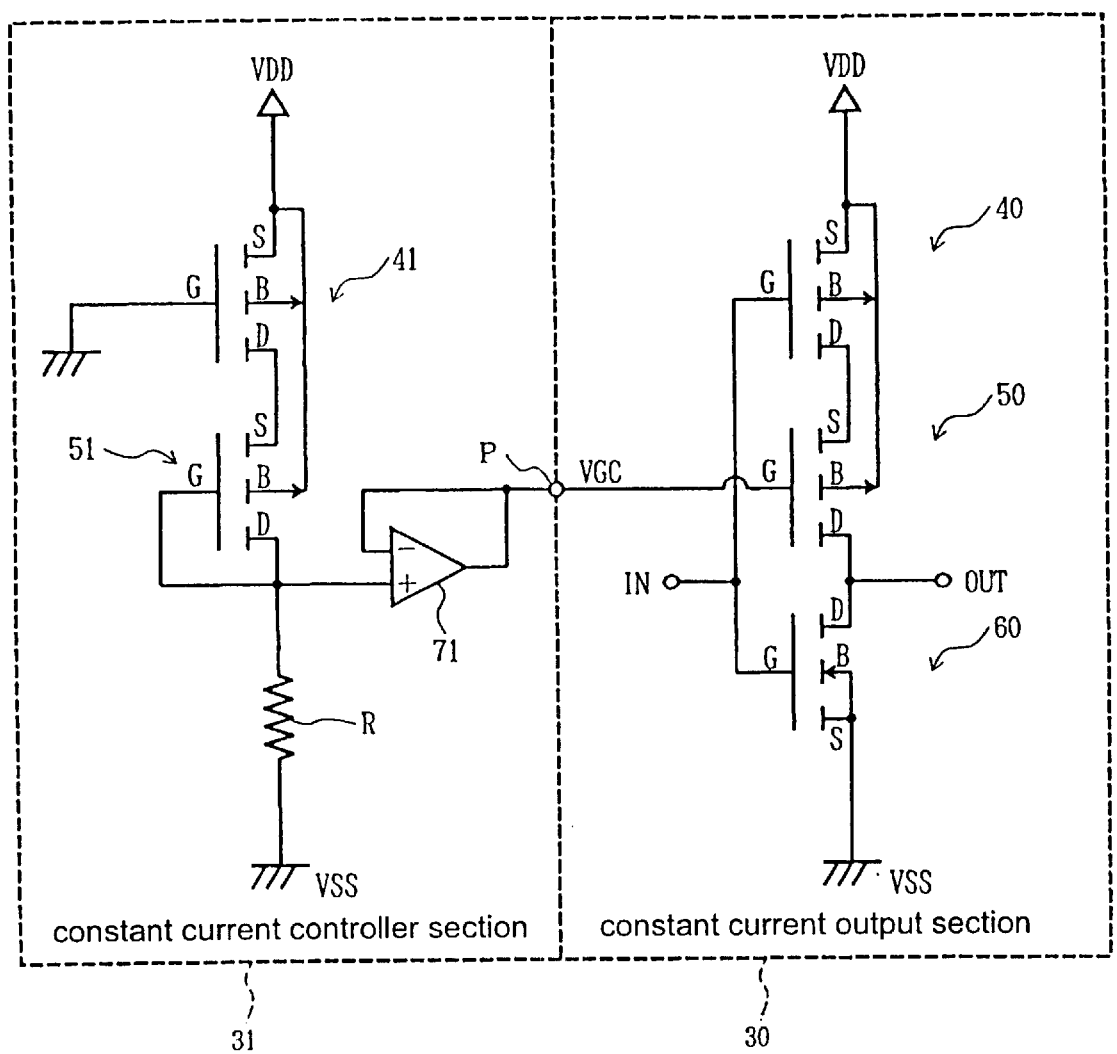
FIG. 12 is a circuit structural diagram of a constant current output driver in a third embodiment mode of the present invention.

FIG. 12 shows the circuit structure of a constant current output driver.

As shown in FIG. 12, the constant current output driver according to this embodiment mode is made up of a constant current output section 30 and a constant current control section 31.

In the case where the constant current output section 30 is connected to the organic EL panel 1 shown in FIG. 22, there exist the constant current output sections 30 of the same number m as m which is the number of the respective anode lines A1 to Am, or of the number m/n (n is the number when a plurality of constant current output drivers are used) as in the drive circuit 3. However, because those constant current output sections 30 are of the same structure, one constant current output section 30 will be shown and described.

One constant current control section 31 exists. Then, the output of one constant current control section is inputted in parallel to the respective input sections of a plurality of constant current output sections 30 (the gates Gs of the constant current FETs 50 which will be described). Also, the constant current control section 31 is so structured as to have the same temperature characteristics as those of the constant current output section 30.

That is, the constant current output driver according to this embodiment mode is made up of one constant current control section 31 and a plurality of constant current output sections 30 connected in parallel with the constant current control section 31. Note that the above relationship is also applied to other embodiment modes which will be described later.

The constant current output section 30 is identical in structure with that of FIG. 5 which was described in the first embodiment mode.

On the other hand, the constant current control section 31 is designed in such a manner that the output system including elements of from the power supply VDD to the output section P is formed of the same elements as those which constitute the output system including elements of from the power supply VDD to the output terminal OUT in the constant current output section 30 so that the temperature characteristic of the constant current control section 31 is identical with that of the constant current output section 30.

In other words, the constant current control section 31 includes a constant current control FET 51 formed of a p-channel MOSFET having the same characteristic (the same standard) as that of a switch FET 40, and a characteristic adjusting FET 41 formed of a p-channel MOSFET having the same characteristic as that of a constant current FET 50. The constant current control section 31 also includes a resistor R which divides the power supply VDD to adjust a voltage applied to the constant current FET 50, and an operational amplifier 71 connected in voltage follower. In this example, it is desirable that the gate length, the gate width, VTH and the gate insulating film thickness of the constant current control FET 51 are made coincident with the gate length, the gate width, VTH and the gate insulating film thickness of the constant current FET 50, because the temperature characteristic is equal between the FETs 50 and 51 not depending on a set output current value. In order to reduce the current consumption of the constant current control section 31, the gate width of the constant current control FET is made smaller than that of the constant current FET 50, and the value of (gate width/gate length), VTH and the gate insulating film thickness of the constant current control FET 51 are made coincident with those of the constant current FET 50.

The constant current control FET 51. and the characteristic adjusting FETs 41 and 60 are of the enhancement MOSFET, respectively.

The source S of the characteristic adjusting FET 41 is connected to the power supply VDD and connected with the drain D of the characteristic adjusting FET 41 and the source S of the constant current control FET 51.

The gate G of the characteristic adjusting FET 41 is connected to the ground. For that reason, the characteristic adjusting FET 41 is always in the on-state, and the temperature characteristic in the output system of the constant current control section 31 is so adjusted as to have the same temperature characteristic as that of the output system including the characteristic adjusting FET 41 of the constant current output section 30.

The gate G of the constant current control FET 51 is connected to the drain D thereof. In this way, the constant current control FET 51 is structured to always operate in the saturated region by connecting the gate G in the saturated manner.

The drain D (gate G) of the constant current control FET 51 is connected to the non-inverse input terminal of the operational amplifier 71 and also connected to one end of the resistor R for dividing the voltage of the power supply VDD.

The operational amplifier 71 is connected to the gate G of the constant current FET 50 through the output section P of the constant current control section 31. Also, the operational amplifier 71 constitutes a voltage follower circuit by direct connection of the output terminal to the inverse input terminal. The operational amplifier 71 having voltage follower connection is used to stabilize the output of the constant current control FET 51.

Another end of the resistor R is connected to the ground.

The resistance value of the resistor R is set so that a desired gate voltage VGC is applied to the gate G of the constant current FET 50 through the operational amplifier 71 and the output section P. The drain current I1 of the constant current FET 50 is determined in accordance with the set gate voltage VGC. The current value of the drain current I1 is a given current value necessary for light emission of the organic EL of the organic EL panel 1, and for example, I1=200 1A is used.

As the resistor R for obtaining a given gate voltage VGC, a resistor having a resistance value adjusted in advance can be used, however, a variable resistor may be used or the resistance values of a plurality of resistors may be adjusted by fuse trimming.

Subsequently, the operation of the constant current output driver thus structured will be described.

First, a case in which the temperature is of a given value T1 and not changed will be described.

In this case, the constant current control section 31 applies to the gate G of the constant current FET 50 a given gate voltage VGC which is set without being affected by the temperature since the temperature is constant.

On the other hand, when the constant gate voltage VGC is applied to the gate G, the constant current FET 50 outputs and stops the drain current I1 corresponding to the gate voltage VGC in accordance with the on/off operation of the switch FET 40.

In other words, in a state where an H (high) level signal is supplied from the input terminal IN, the p-channel switch FET 40 comes to an off-state because no channel is formed, and the constant current FET 50 and the power supply VDD are electrically separated from each other. Therefore, no drain current I1 flows in the output terminal OUT. On the other hand, in the case where the input terminal IN is of the H level, because the n-channel switch FET 60 is formed with a channel and comes to an on-state, the output terminal OUT is connected to the ground through the switch FET 60.

Then, when the switching signal is changed over and an L (low) level signal is supplied from the input terminal IN, the channel of the switch FET 60 disappears and is electrically separated from the output terminal OUT. Also, the switch FET 40 is formed with a channel and comes to the on-state, and the power supply VDD and the constant current FET 50 are connected to each other. As a result, a constant drain current I1 is supplied to the output terminal OUT from the power supply VDD. through the constant current FET 50.

Subsequently, the operation of the constant current output driver in a case where the temperature changes from T1 to T2 will be described.

Figure 13:
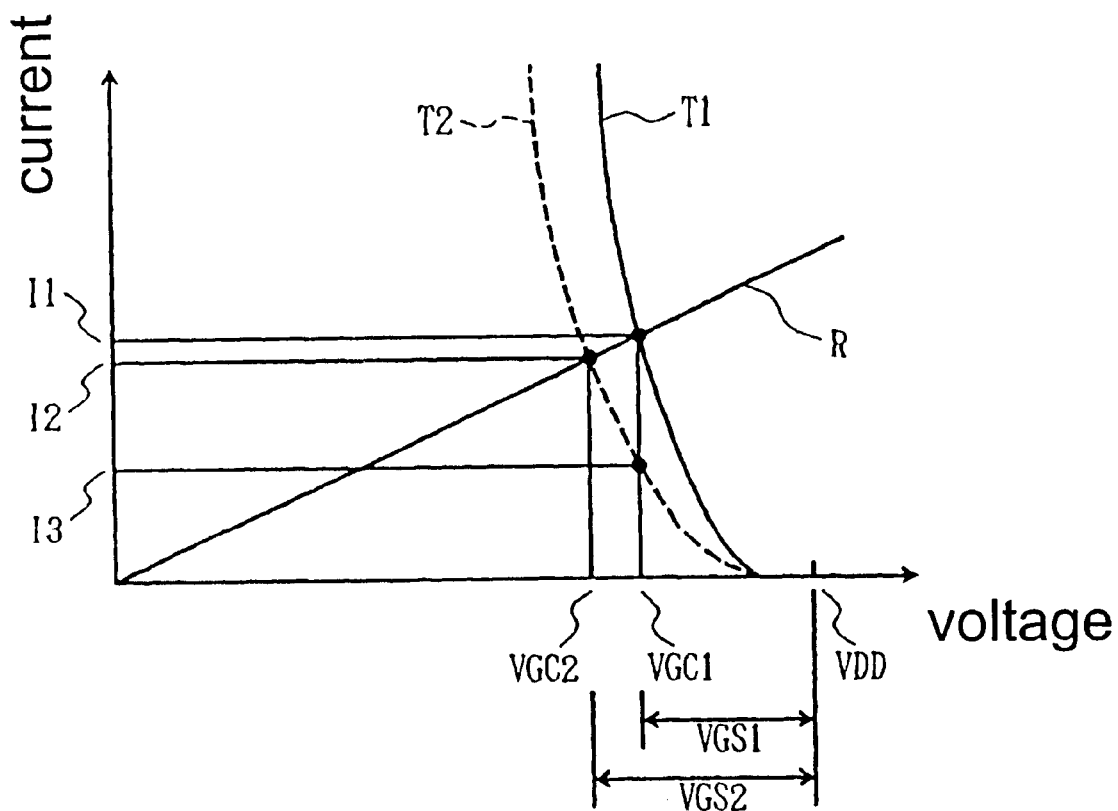
FIG. 13 is an explanatory diagram showing an influence of the temperature change on a constant current FET and a constant current control FET in the above third embodiment mode.

FIG. 13 shows the influence of a change in temperature in the constant current FET 50 and the constant current control FET 51.

In FIG. 13, a curve T1 represents the gate voltage to the drain current characteristic curves T1 and T2 of the constant current FET 50 and the constant current control FET 51 at a temperature T1. Those characteristic curves T1 and T2 are represented by nearly curves of the second order.

As shown in FIG. 13, a relationship between the gate voltage and the drain current of the constant current FET 50 has a characteristic that changes the curve from T1 to T2 depending on the temperature T. For that reason, if VGC applied to the gate G of the constant current FET 50 is always constant at the temperatures T1 and T2, the drain current Id which was I1 at the temperature T largely changes to I3 at the temperature T2. Because the drain current Id changes by nearly square of the gate voltage as shown in the curve T1, the output current supplied to the organic EL panel 1 from the output OUT terminal largely changes depending on the temperature with the result that a constant luminance is not obtained.

On the contrary, the constant current control FET 51 of the constant current control section 31 according to this embodiment mode is connected in series to the resistor R and the gate G is connected in the saturated manner. For that reason, the drain current that flows in the constant current control FET 51 is determined by the intersection of the characteristic curves T1 and T2 of the constant current control FET 51 with a straight line R due to the resistor R.

Accordingly, the drain current of the constant current control FET 51 only changes from the drain current I1 determined by the intersection of the characteristic curve T1 with the straight line R to the drain current I2 determined by the intersection of the characteristic curve T2 with the straight line R even if the temperature changes from T1 to T2. The drain current of the constant current control FET 51 is slightly affected by the temperature but its influence can be suppressed to a small degree.

In other words, in the case where the temperature goes down from T1 to T2, the gate voltage drop from VGC1 to VGC2 so that the voltage VGS between the gate G and the power supply VDD (which can approximate to the voltage between the gate and the source S) increases from VGS1 to VGS2. For that reason, even if the temperature goes down to T2, the drain current I2 larger than the current I3 in the case where the voltage VGS is kept to VGS1 flows. Accordingly, the amount of a change from the drain current I1 at the time of the temperature T1 can be suppressed to the small value.

In this embodiment mode, as shown in FIG. 12, the output system (from the power supply VDD to the output section P) of the constant current control section 31 and the output system (from the power supply VDD to the output OUT) of the constant current output section 30 are identical in structure with each other. In addition, since the gate G of the constant current control FET 51 is connected to the gate G of the constant current FET 50 through the operational amplifier 71 having the voltage follower connection, both of the gate voltages of the constant current control FET 51 and the constant current FET 50 are identical with each other.

Accordingly, the constant current FET 50 operates with respect to the temperature change as in the constant current control FET 51. In other words, in the case where the temperature changes from T1 to T2, the drain current of the constant current FET 50 largely changes from I1 to I3 if the gate voltage is constant. However, the gate voltage also changes from VGC1 to VGC2 as the temperature changes, the drain current of the constant current FET 50 is suppressed to the small change of from I1 to I2.

As described above, according to this embodiment mode, the output system in the constant current control section 31 is made identical in structure with the output system in the constant current output section 30 at the time of the on-state, and the gate G of the constant current control FET 51 corresponding to the constant current FET 50 is connected in the saturated manner and connected to the gate G of the constant current FET 50. Therefore, a change in the output current (drain current) of the constant current FET 50 which constitutes the constant current output section 30 depending on the temperature can be suppressed to the small value.

Also, according to this embodiment mode, the output system in the constant current control section 31 is made identical in structure with the output system in the constant current output section 30 at the time of the on-state.

In other words, the constant current control FET 51 having the same characteristic as that of the constant current FET 50 is employed. In addition, taking the temperature characteristic of the output current due to the switch FET 40 into consideration, adjustment is made so that the switch FET 40 has the same characteristic as that in the on-state by the following manner. That is, the characteristic adjusting FET 41 having the same characteristic as that of the switch FET 40 is connected in the same manner as that of switch FET 40, and the gate G of the characteristic adjusting FET 41 is connected to the ground and always becomes in the on-state. As a result, the drain current of the constant current FET 50 and the drain current of the constant current control FET 51 can be made identical with each other.

For that reason, in the case where the constant current value supplied to the organic EL panel 1 from the plural constant current output sections 30, respectively, is adjusted to a given current value, for example, 200 ÌA, if one resistance value of the resistor R in the constant current control section 31 is adjusted to set the drain current of the constant current control FET 51 to a desired value (200 ÌA, etc.), it is possible to adjust the drain current of the constant current FET 50 to a desired value.

In other words, since there is no necessity that an adjustment element or the like is disposed on each of the constant current output sections 30, or the drain current of the constant current FET 50 is adjusted for each of the constant current output sections 30, the element is downsized, and the output current adjustment is facilitated.

Subsequently, a fourth embodiment mode will be described with reference to FIG. 14.

Figure 14:
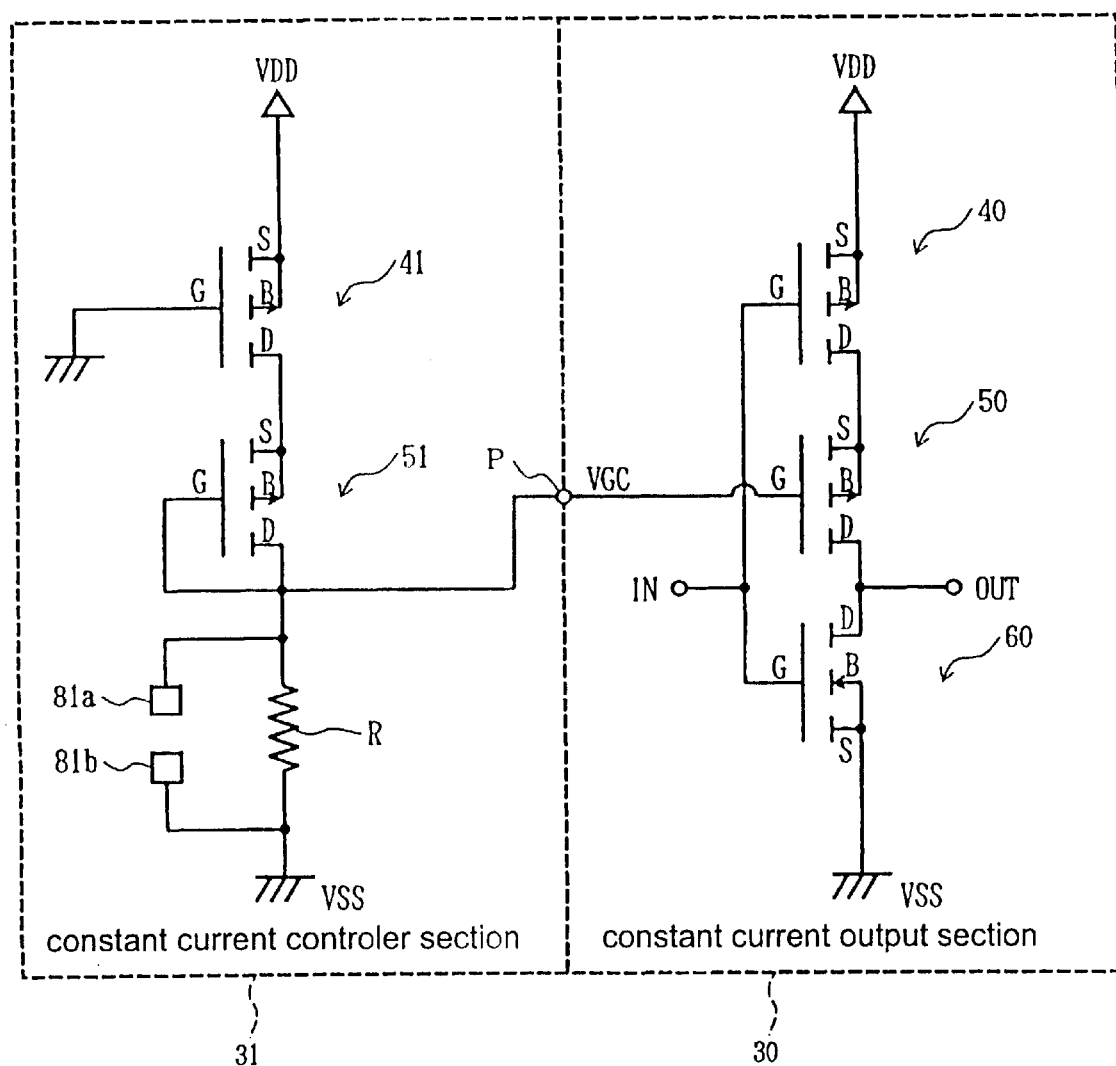
FIG. 14 is a circuit structural diagram of a constant current output driver in a fourth embodiment mode of the present invention.

FIG. 14 shows the structure of a constant current output driver in the fourth embodiment mode. The constant current output driver according to this embodiment mode is made up of one constant current control section 31 and a plurality of constant current output sections 30 connected in parallel with the constant current control section 31, as in the third embodiment mode.

Figure 15:
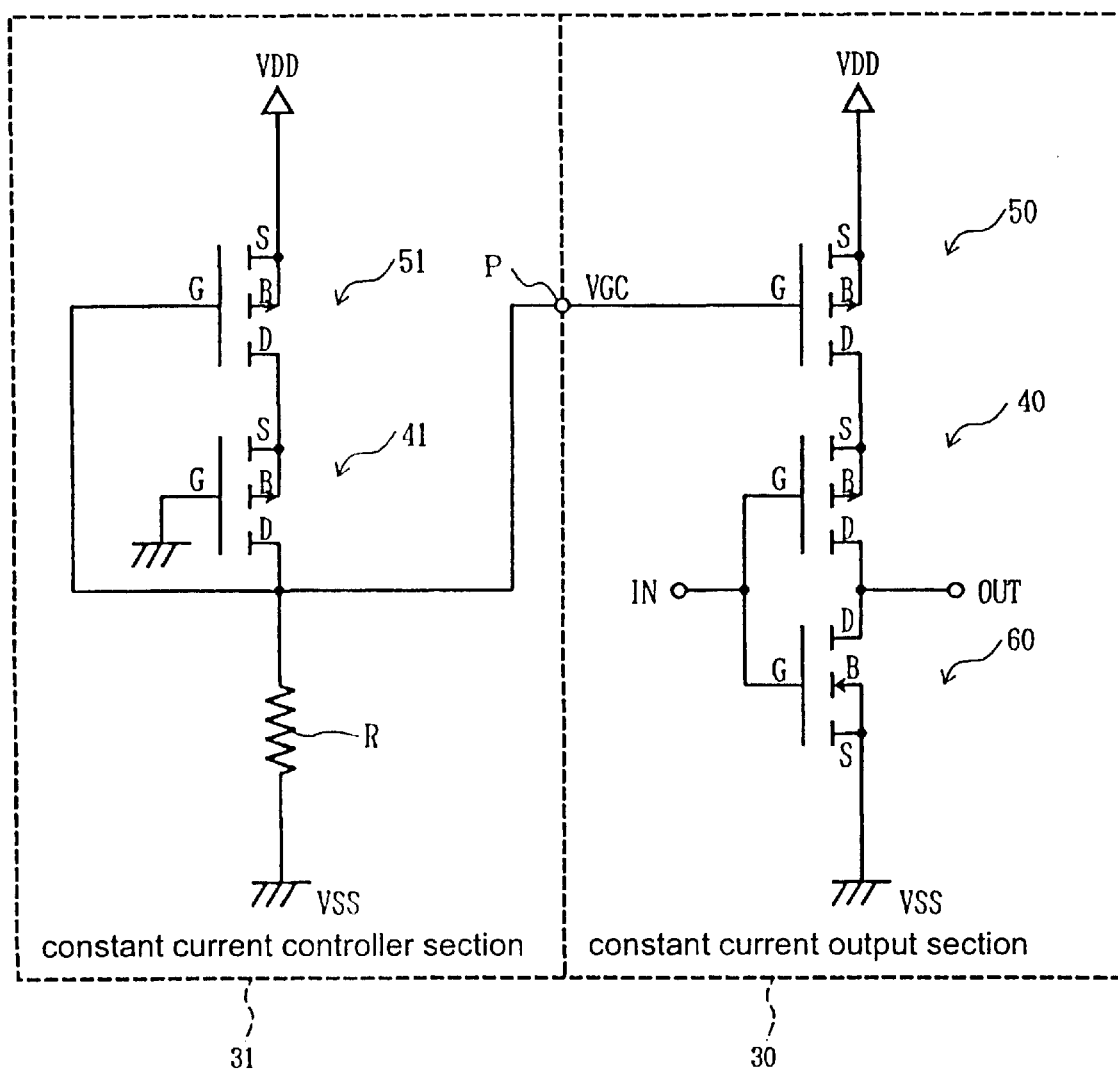
FIG. 15 is a circuit structural diagram of a constant current output driver in a fifth embodiment mode of the present invention.

In FIG. 14 and FIG. 15 which will be described later, the substrates B of the respective FETs are connected to the sources S in the same manner as that of the second embodiment mode. As described in the first and second embodiment modes, in order to reduce the over-shoot of the output constant current, it is desirable that the potential of the substrates B of all the FETs in FIGS. 14 and 15 is connected to VDD or VDD. However, for facilitation of understanding the figures, in this example, the substrate B of the FET is connected to the source S.

As shown in FIG. 14, in the constant current output section 30 according to the fourth embodiment mode, the substrate B of the constant current FET 50 is connected to not the power supply VDD but the drain D of the switch FET 40, and other structures are identical with those in the third embodiment mode.

Also, the constant current control section 31 is different from that in the third embodiment mode in that the substrate B of the constant current control FET 51 is connected to not the power supply VDD but the drain D of the characteristic adjusting FET 41, and in that the gate G of the constant current control FET 51 saturation-connected to the drain D is directly connected to the gate G of the constant current FET 50 not through the operational amplifier 71. Also, in the constant current control section 31, both ends of the resistor R are connected with terminals 81a and 81b for externally connecting a resistor r for adjustment of the resistance value in parallel with the resistor R. Other structures are identical with those in the first embodiment mode.

Similarly, in this embodiment mode, the output system (from the power supply VDD to the output section P) of the constant current control section 31 and the output system (from the power supply VDD to the output OUT) of the constant current output section 30 are identical in structure with each other. The influence due to the temperature change on the output current in the constant current output section 30 can be suppressed to a small degree.

Also, in this embodiment mode, in the case where the output current of the constant current output section 30 (the drain current of the constant current FET 50) is set to a desired value, if the resistor R is adjusted so that the drain current of the constant current control FET 51 in the constant current control section 31 is set to the same desired value, adjustment can be readily made.

Also, since the gate G of the constant current control FET 51 is directly connected to the gate G of the constant current FET 50 not through the operational amplifier 71, it is possible to reduce the power consumption. Accordingly, similarly in the first embodiment mode, if the operational amplifier 71 is omitted, and the gate G of the constant current control FET 51 is directly connected to the gate G of the constant current FET 50, the power consumption can be reduced.

Also, according to the fourth embodiment mode, since the terminals 81a and 81b for connecting the external resistor r for adjustment of the resistance value in parallel with the resistor R are provided, the fine adjustment can be conducted by the external resistor r with the resistor R as the fixed value. In this manner, since the terminals 81a and 81b for externally connecting the resistor are disposed, the constant current output driver can be adjusted from the external. Note that the constant current control section 31 may provide only the external terminals 81*a* and 81*b* without provision of the resistor R. In this case, the external resistor r is connected between the terminals 81*a* and 81*b* after the constant current output driver has been manufactured so that the output current (the drain current of the constant current FET 50) becomes a given value (for example, 200 micro A).

The structure of providing the terminals 81*a* and 81*b* for connecting the resistor r for adjustment of the resistance value (including a case in which only the terminals 81*a* and 81*b* are connected without the resistor R) in the above fourth embodiment mode can be applied to the third embodiment mode, likewise, and also can be applied to other respective embodiment modes which will be described later.

Subsequently, a fifth embodiment mode will be described.

FIG. 15 shows the structure of a constant current output driver in the fifth embodiment mode. The constant current output driver according to this embodiment mode is made up of one constant current control section 31 and a plurality of constant current output sections 30 connected in parallel with the constant current control section 31, as in the first embodiment mode.

In the fifth embodiment mode, the constant current output driver described with reference to FIG. 23 is used as the constant current output section 30, and the constant current control section 31 is structured in the same arrangement as the constant current FET 50, the switch FET 40 and the switch FET 60 in the constant current output section 30.

In the constant current control section 31 of this embodiment mode, the gate G of the constant current control FET 51 is saturation-connected to the drain D of the constant current control FET 51.

Similarly, in the fifth embodiment mode, since the output system of the constant current control section 31 and the output system of the constant current output section 30 are identical in structure with each other, a fluctuation of the output current in the constant current output section 30 due to the temperature change can be suppressed to a small degree.

Also, in the case where the output current of the constant current output section 30 (the drain current of the constant current FET 50) is set to a desired value, if the resistor R is adjusted so that the drain current of the constant current control FET 51 in the constant current control section 31 is set to the same desired value, adjustment can be readily made.

As described in the above third to fifth embodiment modes, as the structure of the constant current output section 30, the connection of the constant current FET 50 and the switch FET 40 can be made with various connections, and even in any one of the structures described above or other structures, with the connection of the constant current control section 31 having the temperature characteristic of the same tendency (including the same case) as described in the third to fifth embodiment modes, the amount of a change in the drain current of the constant current FET 50 due to the temperature change can be suppressed to a small value.

However, in the constant current output section 30 in the constant current output driver, taking over-shoot in the on-state due to the on/off of the input IN, etc., into consideration, it is most desirable that the arrangement is selected from the constant current output section 30 in the first embodiment mode, and the constant current control section 31 having the same FET arrangement is selected.

Hereinafter, the preferred sixth embodiment mode in the constant current output driver according to the present invention will be described in detail with reference to FIG. 16.

Figure 16:
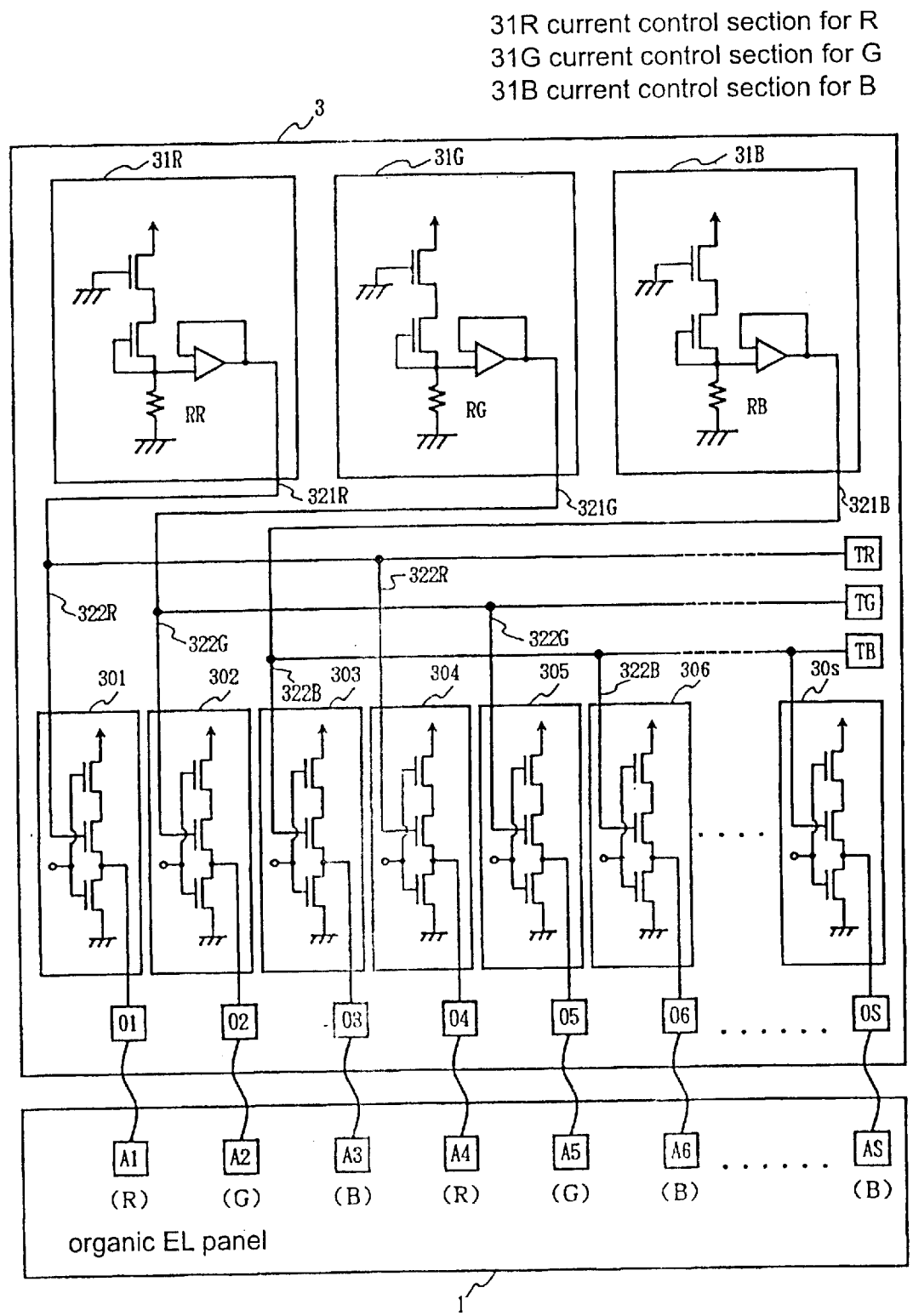
FIG. 16 is a circuit structural diagram of a constant current output driver in a sixth embodiment mode of the present invention, FIGS. 17 A–C are an explanatory diagram of a case in which a plurality of constant current output drivers are disposed in the sixth embodiment mode of the present invention.

As shown in FIG. 16, the constant current output sections 30$_1$ to 30$_s$ that output a constant current in accordance with the value of the applied gate voltage VGC are connected to the output terminals O1 to Os arranged in a line. The gates of those constant current output sections 30$_1$ to 30$_s$ are connected to three constant current control sections 31R, 31G and 31B which generate the gate voltages for R, G and B in the stated order. In other words, the respective current control sections 31R, 31G and 31B are connected to every three constant current output sections 30$_1$ to 30$_s$ by the voltage wirings 321R, 321G and 321B and the gate wirings 322R, 322G and 322B, respectively. With this structure, the output terminals O1 to Os output the respective constant currents for R, G and B in the arrangement order.

Consequently, it is possible that the wirings from the output terminals O1 to Os of the constant current output driver with respect to the color organic EL panel 1 having the anode terminals A1 to A2 arranged in a line are formed of a single layer.

Figure 25:
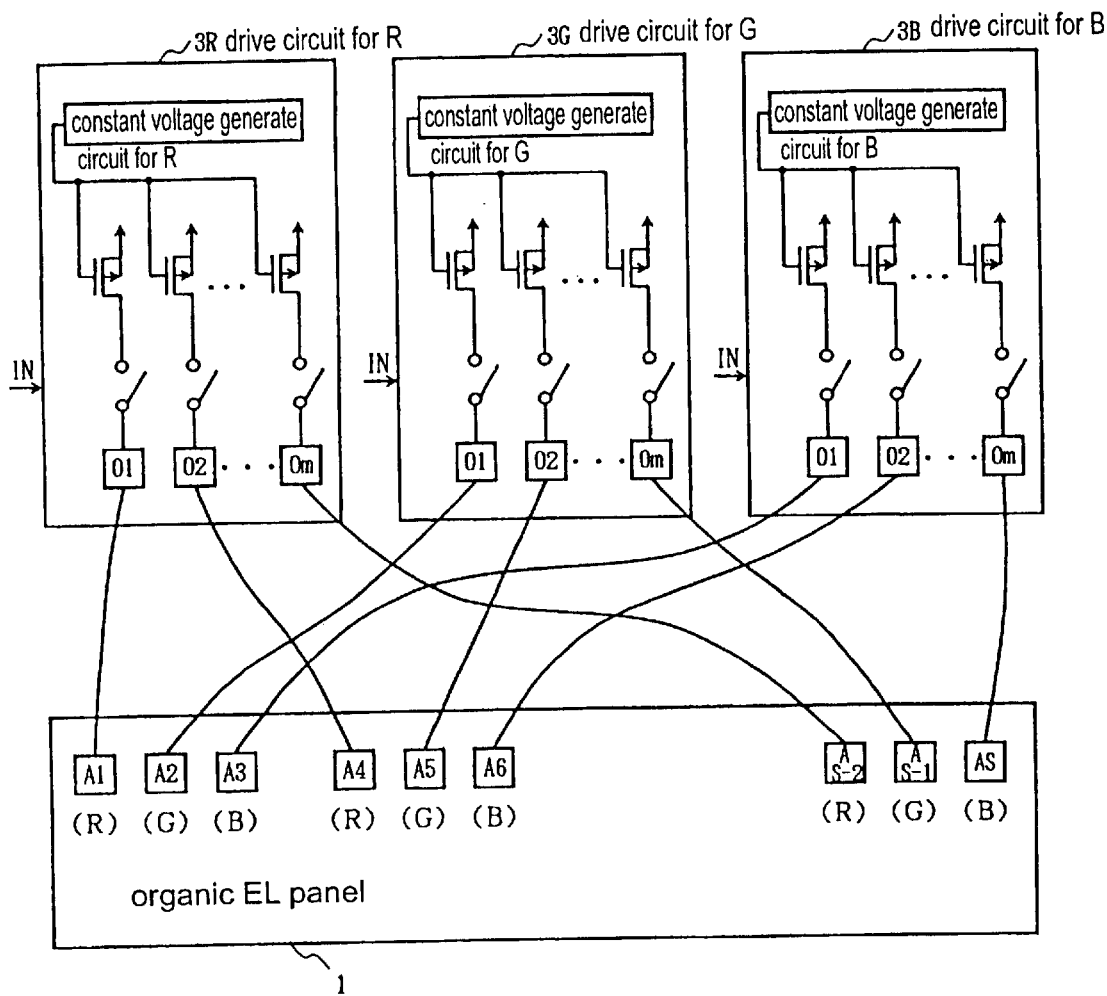
FIG. 25 shows the structure of the conventional display unit in which the conventional constant current output drive is formed of an enhancement MOSFET to conduct color display on the organic EL panel.

The constant current output driver 3 in this embodiment mode can be used not only as the drive circuit 3 in the display unit using the organic EL panel 1 for color display which was described with reference to FIGS. 22 and 25, but also as a driver of the LED panel or a device that requires the constant current drive.

FIG. 16 shows the circuit structure of the constant current output driver 3.

As shown in FIG. 16, the constant current output driver 3 includes s output terminals O1 to Os, s constant current output sections 30$_1$ to 30$_s$, three wiring terminals TR, TG and TB, and three constant current control sections 31R, 31G and 31B.

When the common contents will be described without specifically designating the output terminals O1 to Os, the constant current output sections 30$_1$ to 30$_s$, the wiring terminals TR, TG and TB, and the constant current control sections 31R, 31G and 31B, they will be described as the output terminal O, the wiring terminal T, the constant current output section 30 and the constant current control section 31, respectively. The same is applied to other elements.

The output terminals O1 to Os are arranged in a line in the order corresponding to the anode line terminals A1 to As of a display unit to which the constant current output driver 3 is applied, for example, the color organic EL panel 1 shown in FIG. 16. In this embodiment mode, the output terminals O1 to Os are arranged in a line, but if the single-layer wiring with the color organic EL panel 1 is enabled, the output terminals O1 to Os may be arranged in zigzags so as to be arranged in plural lines.

Also, the number s of the output terminals O1 to Os is made coincident with the number s of the anode line terminals A of the color organic EL panel 1, but may be set to 1/w (w is a positive number) of the number of the anode line terminals A to drive the color organic EL panel 1 by using the w constant current output drivers 3.

In addition, it is preferable that the number s is the multiple of the number 3 of the three primary colors R, G and B necessary for color display and also the multiple of the number 8 that constitutes one byte. Also, s=192 is applied in this embodiment mode from the viewpoint of the actual resolution of the display panel and this number is most desirable.

The s constant current output sections 30 are disposed in correspondence with the number s of the output terminals O. The constant current output sections 30 are formed of field effect transistors (FETs). All of the constant current output sections 30 are identical in structure with each other and designed so that a constant current is outputted from the corresponding output terminal O in accordance with the constant voltage value VGC applied to the gate G. That is, the respective constant currents necessary for the light emitting elements for R, G and B in the color organic EL panel 1 are outputted.

The output of the output constant current turns on/off in response to the switching signal supplied from the external control unit (not shown) such as a controller.

The constant current control section 31 includes a constant current control section 31R for R, a constant current control section 31G for G and a constant current control section 31B for B which output the gate voltage VGC for R, G and B, for outputting a current necessary for the light emitting elements for R, G and B from the constant current output section 30.

Those three constant current control sections 31 are identical in structure with each other except that the resistance values of the resistors RR, RG and RB for adjusting the value of the output voltage (the gate voltage VGC) are different from each other.

The output of the constant current control section 31R for R is connected with the wiring terminal TR by a voltage wiring 32R for R. The respective wiring terminals T are terminals used for measuring the output voltage of the respective constant current control sections 31 or for testing the circuit state.

The voltage wiring 321R for R between the wiring terminal TR and the constant current control section 31R for R is also connected to the constant current output sections 301, 304, 307, . . . 30s–2 by the gate wiring 322R.

Similarly, the output of the constant current control section 31G for G is connected with the wiring terminal TG by a voltage wiring 321G for G and also connected to the constant current output sections 302, 305, 308, . . . 30s–1 by the gate wiring 322G. Also, the output of the constant current control section 31B for B is connected with the wiring terminal TB by a voltage wiring 321B for B and also connected to the constant current output sections 303, 306, 309, . . . 30s by the gate wiring 322B.

As described above, the constant current control section 31R for R, the constant current control section 31G for G and the constant current control section 31B for B are connected to every three constant current output sections 301 to 30s by the voltage wiring 321R for R and the gate wiring 322R, the voltage wiring 321G for G and the gate wiring 322G, and the voltage wiring 321B for B and the gate wiring 322B, respectively. With this structure, the constant current for R, the constant current for G and the constant current for B are outputted from the output terminals O1 to Os arranged in a line or a plurality of lines in the arrangement order.

The structures of the constant current control section 31R for R, the constant current control section 31G for G and the constant current control section 31B for B in FIG. 16 are structured in the same manner as those in the third embodiment mode of FIG. 12, but may be structured in the same manner as those in any one of the above-described third to fifth embodiment modes.

Subsequently, a seventh embodiment mode will be described.

In the second embodiment mode, in the case where IC chips for a plurality of constant current output drivers are connected to the color organic EL panel 1, adjustment can be made so that a difference in the current supplied to both ends of the color organic EL panel 1 or a difference in the current value between end portions of the adjacent constant current output driver ICs becomes small.

FIG. 17 shows a state in which a plurality of constant current output driver IC chips according to the sixth embodiment mode which was described with reference to FIG. 16 are connected, to the color organic EL panel 1, and the current values outputted from the respective output terminals O.

Figure 17A:
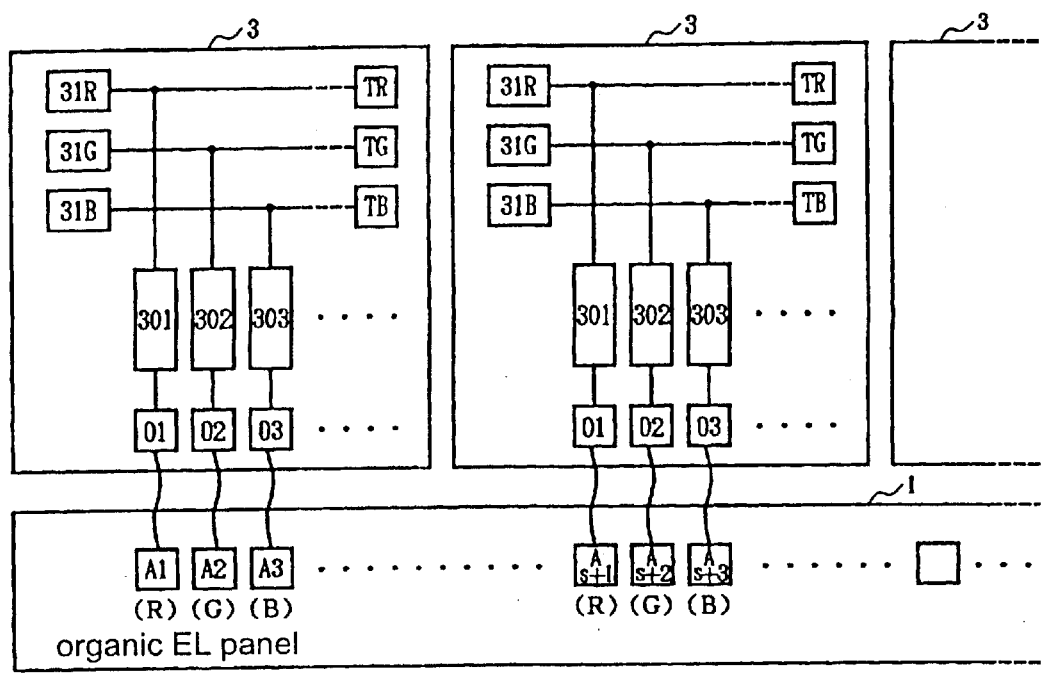

As shown in FIG. 17(a), in the case where (s×n) anode terminals A exist in the color organic EL panel 1, connection is made by using the n constant current output drivers 3 (the number of output terminals O=s) of the first embodiment mode.

In this case, if the gate voltages VCG outputted to the respective constant current output sections 301 to 30s from the respective constant voltage output circuits 31R, 31G and 31B for R, G and B through the voltage wirings 321R, 321G and 321B are varied within the respective constant current output driver 3, the output current values from the respective constant current output sections 301 to 30s are varied.

Also, even if the gate voltages VCG are not varied, the outputted current values are varied within the chips due to the characteristic variation of the FETs that constitute the respective constant current output sections 301 to 30s.

As described above, the gate voltages VGC applied to the respective constant current output sections 30 do not always have the same value depending on various conditions such as the wiring resistance of the voltage wiring 321 or the gate wiring 322 but have voltage values slightly different due to a wiring distance or the like. The difference in the gate voltage VGC and the characteristic variation of the respective constant current output sections 30 cause a difference in the current values outputted from the respective constant current output sections 30 connected to the same voltage wiring 321 to the output terminals O.

Figure 17B:
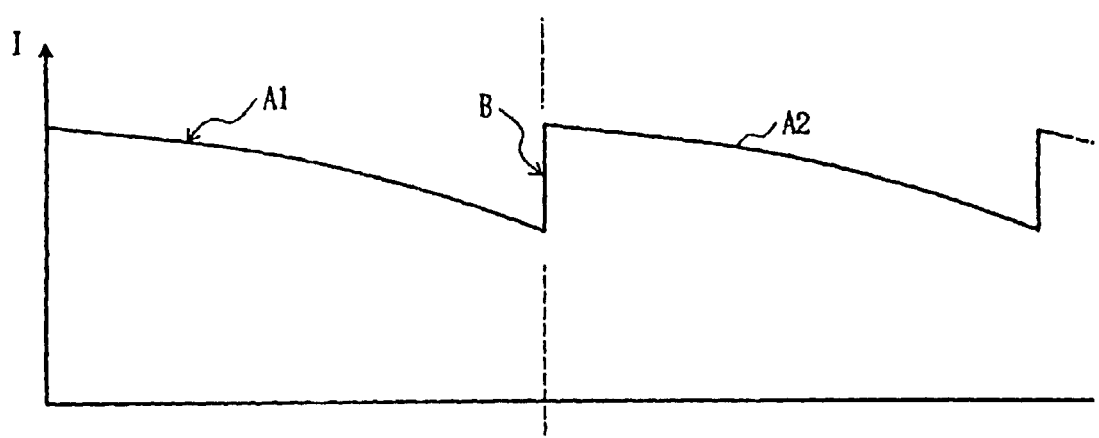

In FIG. 17(b), the axis of ordinate represents the current values outputted from the respective constant current output sections 301, 304, . . . 30s–2 connected to the constant current control section 31 for R by the voltage wiring 321R for R and the gate wiring 322R for R (accordingly, the current values outputted from the corresponding output terminals O1, O4, . . . Os–2), and the axis of abscissa represents the respective constant current output sections 30 (or the respective output terminals).

As shown in FIG. 17(b), because a difference between the adjacent constant current output sections 301 and constant current output section 304 connected to the same voltage wiring 321R is slight, a difference in the current supplied to the adjacent organic ELs for R which are connected to the same constant current output driver is also slight, and a difference in luminance between both the organic ELs cannot be recognized without any problems.

However, if being viewed from the whole one constant current output driver, there is a change in the current value having a constant inclination as a whole as indicated by arrows A1, A2 . . .

For that reason, there arises no problem if a change is made such that the constant current output section 301 and the constant current output section 30s–2 become substantially identical in output current value (for example, such a change that the current value goes up after it goes down once). However, as shown in FIG. 17(b), if a constant or larger difference exists in the output current value between both the output terminals O1 and Os–2 (O2 and Os–1, O3 and Os), a large difference occurs in the current value between the constant current output drivers 3 adjacently arranged as indicated by an arrow B in the figure. As a result, because a difference in the currents that flow in the adjacent organic ELs for R at a portion where the connected constant current output driver changes is large, there is the possibility that there occurs a difference in luminance to the degree where the difference can be recognized.

Figure 17C:
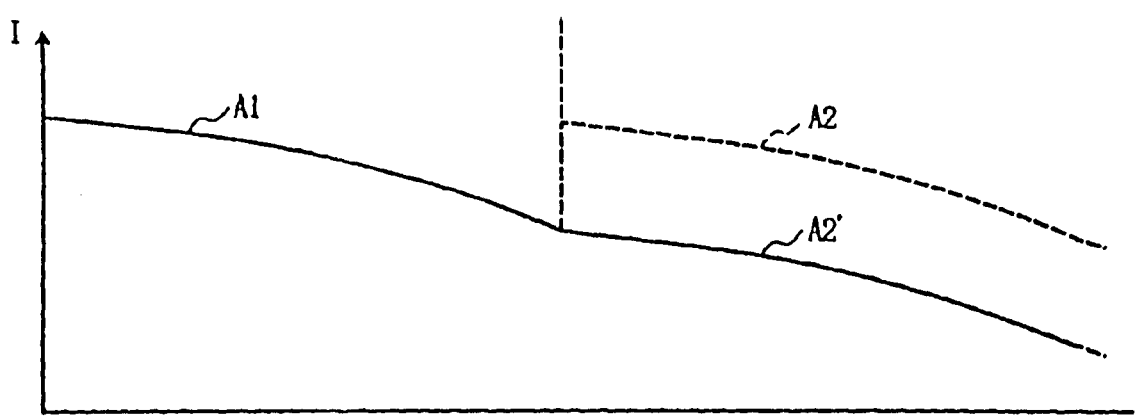

FIG. 17(c) shows the inclination of a current value when a difference in the output current from the end portions of a plurality of constant current output drivers 3 connected to each other is adjusted to be small. In order to reduce the output current difference from the end portions, it is possible to adjust the value of the resistor R and to adjust the output voltage (the gate voltage VGC) of the constant current control section 31. In other words, when as indicated by an arrow A2' in FIG. 17(c), the output current value (the left end value of A2') from the first output terminal O1 of the second constant current output driver 3 from the left is made to lower, a difference in the current value between the end portions of. the adjacent constant current output drivers can be reduced.

However, because the respective constant current output drivers 3 are basically of the same structure, even if the output voltage of the constant current control section 31 is changed, the tendency of the inclination (change) such as right down or right up with respect to the current value shown in FIG. 17(b) is identical. That is, A2' is different in only the absolute value and the tendency of change is identical with that of A2 and A1. For that reason, even if a difference in the current value between the constant current output drivers 3 is small, there is the possibility that an evil influence occurs that a large difference in the current value occurs between both ends, such that one end is bright whereas the other end is dark, when being viewed from the entire color organic EL panel 1 (or the entire plural constant current output drivers) as shown in FIG. 17(c).

Under the above circumstances, in the seventh embodiment mode, not only a voltage at the end portion on a side connected with the constant current control section 31 of the constant current output driver is adjusted, but also a voltage between both the ends can be adjusted.

Figure 18A:
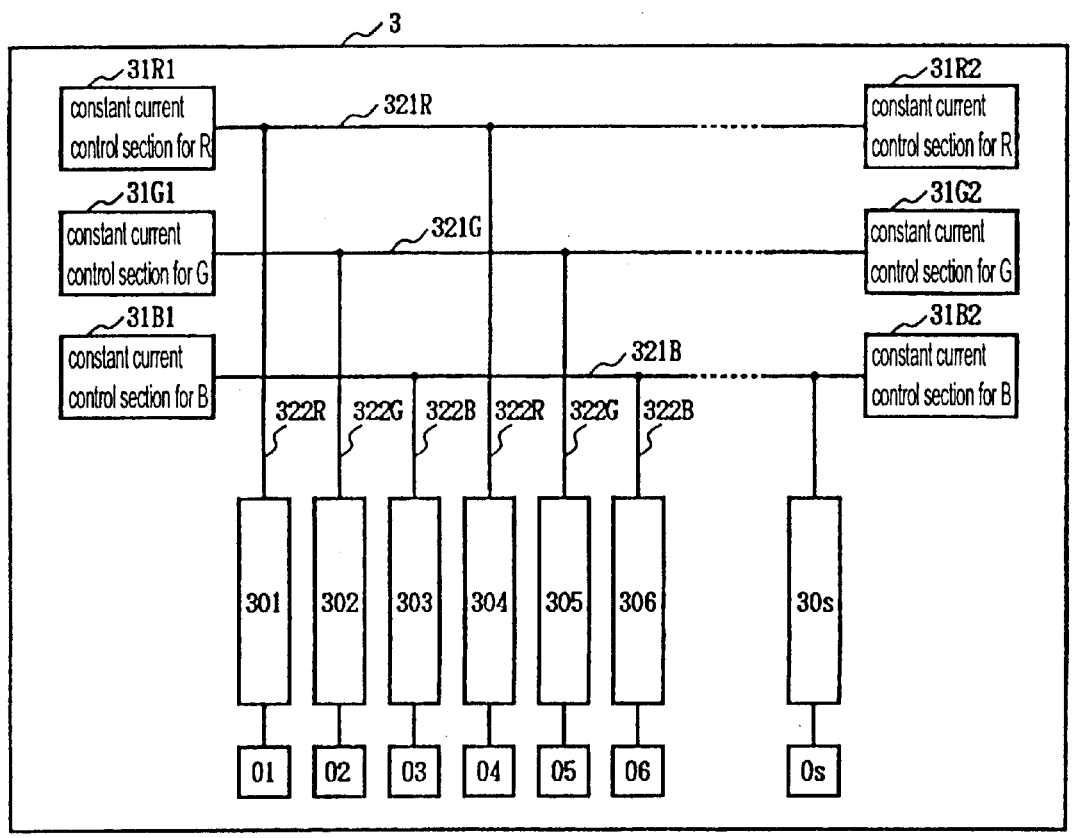
FIGS. 18 are a circuit structural diagram (a) of a constant current output driver in a seventh embodiment mode of the present invention, and an explanatory diagram (b) of voltage adjustment.

FIG. 18(a) shows the structure of the constant current output driver 3 which is capable of adjusting the output current from both the ends of the constant current output sections 30 (that is, the output terminals O) arranged in a line (or multiple stages) in the constant current output driver.

As shown in FIG. 18, the constant current output driver includes two constant current control sections 31, respectively, that is, two constant current control sections for R 31R1 and 31R2, two constant current control sections for G 31G1 and 31G2, and two constant current control sections for B 31B1 and 31B2 (hereinafter, representatively, referred to as "constant current control sections 311 and 312" both of which are representatively referred to as "constant current control sections 31"). Those six constant current control sections 31 as a whole are identical in structure with that of the constant current control section 31 shown in FIG. 12 (the resistance values of the resistors Rare different from each other through adjustment, respectively).

Both the outputs of paired constant current control sections 311 are connected to each other by the voltage wirings 321, and the voltage wirings 321 are connected to every three constant current output sections 30 by the gate wirings 322 as in the sixth embodiment mode.

As described above, according to the seventh embodiment mode, the paired two constant current control sections 311 and 312 are disposed for each color of R, G and B, and both the constant current control sections 311 and 312 are connected to each other by the voltage wiring 321, and the voltage wirings 321 are connected to every three constant current output sections 30 by the gate wirings 322. Accordingly, the inclination of the respective output current values in the arrangement direction of the respective constant current output sections 30 arranged in a line or the like (or the respective output terminals O) can be adjusted at both ends.

Figure 18B:
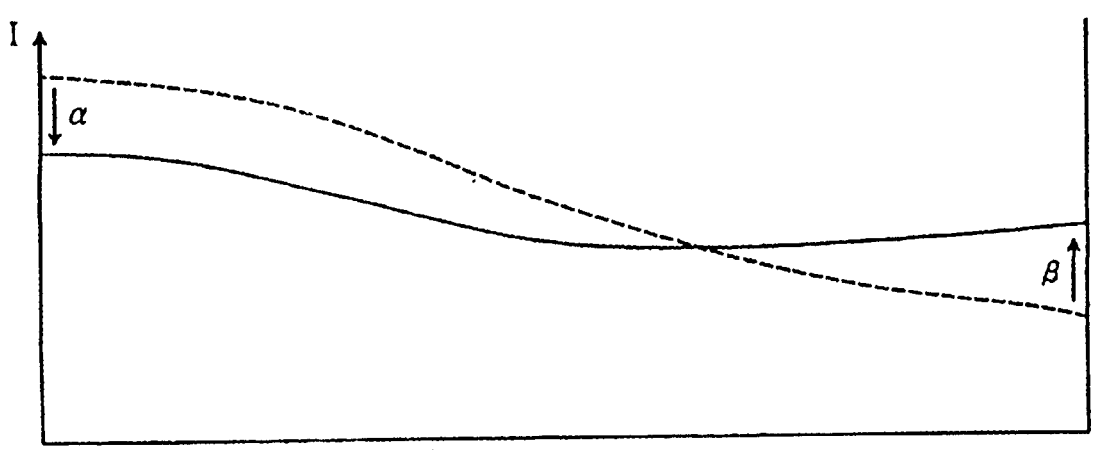

With the above structure, if the constant current output driver 3 the output current values of which have the tendency of right down in the arrangement direction of the output terminal O as shown in FIG. 18(b), the current value outputted from the output terminal O1 (the constant current output section 301) at the left end can be reduced as indicated by an arrow à by increasing the output voltage (gate voltage VGC) of the constant current control section for R 31R1 (decreasing the voltage VGS with respect to VDD). Further, the current value outputted from the output terminal Os–2 (the constant current output section 30s–2) at the right end can be increased as indicated by an arrow A by decreasing the output voltage of the constant current control section for R 31R2 (increasing the voltage VGS).

As described above, according to the seventh embodiment mode, because the output currents of the constant current output sections 30 (output terminals 0) at both the ends can be adjusted by the paired constant current control sections 311 and 312, for example, if a current difference between both the ends is Δi in the unadjusted state, the constant current control section 31 at a side close to the output terminal at which the current value is high is adjusted so that the current value at a side where the current value is high is increased by Δi/2. Also, the constant current control section 31 at the opposite side is adjusted so that the current value at a side where the current value is low is increased by Δi/2. This makes it possible to prevent a change in luminance at both the ends of the adjacent constant current output drivers (refer to the arrow B in FIG. 17(b)) and a difference in brightness at both the ends of the color organic EL panel 1 (refer to FIG. 17(c)) from occurring, even if a plurality of constant current output drivers 3 are disposed.

Subsequently, an eighth embodiment mode will be described.

FIG. 19 shows the structure of the constant current output driver 3 in accordance with the eighth embodiment mode.

According to the eighth embodiment mode, in the seventh embodiment mode where the pair of constant current control sections 311 and 312 are disposed for each of R, G and B, when the output current is adjusted by the voltage adjustment of the respective constant current control sections 311 and 312, the adjustment can be surely conducted.

In other words, as shown in FIG. 19, wiring resistances r are disposed at given intervals on the respective voltage wirings 321 that connect the paired constant current control sections 311 and 312.

As usual, there is a case in which a protective resistor r0 is disposed between the wiring 321 and the constant current control section 31 in order to prevent the influence due to static electricity in the output of the constant current control section 31. Then, in the constant current output driver 3 according to the seventh embodiment mode shown in FIG.

18, in the case of connecting the protective resistor r0, even if the voltage is adjusted by the paired constant current control sections 311 and 312, the amount of the adjusted voltage is used as a voltage drop in the protective resistor r0 with the result that adjustment shown in FIG. 18(b) cannot be made.

Figure 19A:
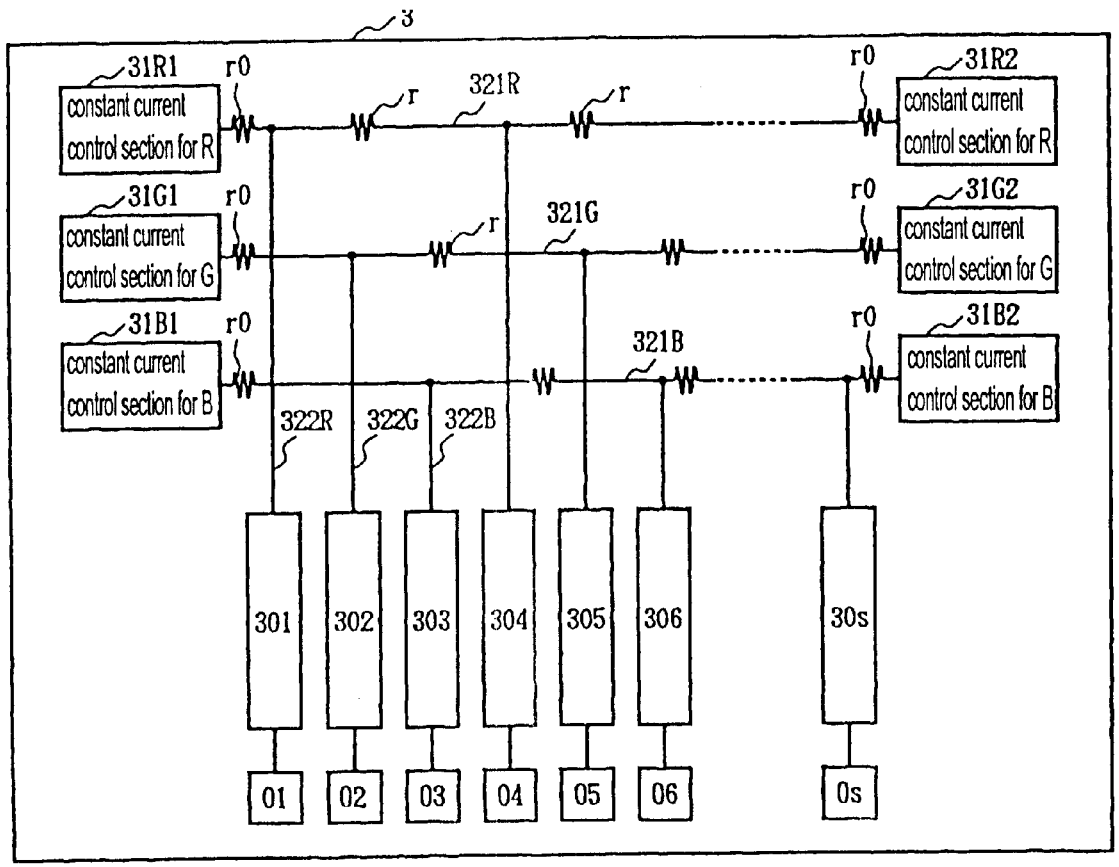
FIGS. 19 are a circuit structural diagram (a) of a constant current output section in an eighth embodiment mode of the present invention, and an explanatory diagram (b) of voltage adjustment.
Figure 19B:
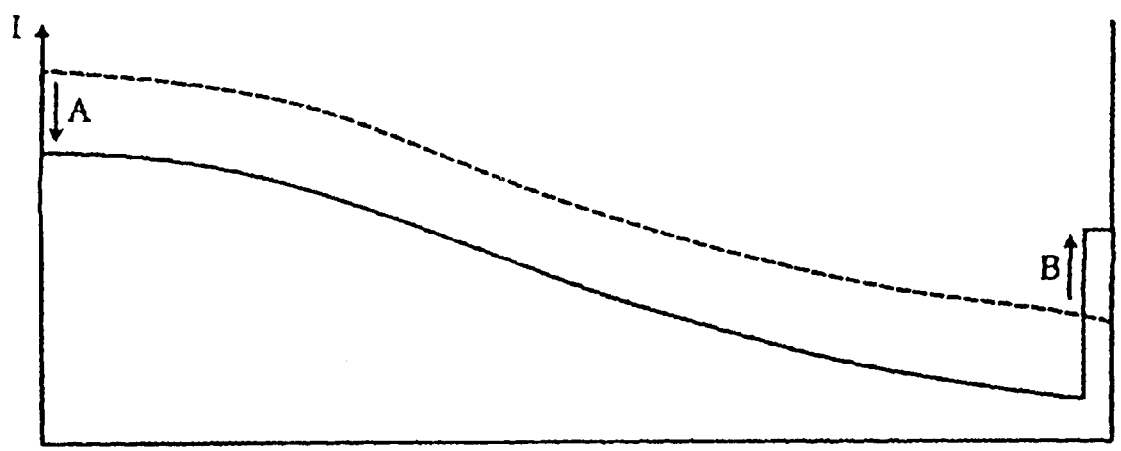

That is, as shown in FIG. 19(b), even if the voltages of the constant current control sections 311 and 312 are adjusted with respect to the current (indicated by a dotted line) outputted from the output terminal O in the case where voltage is not adjusted, there is a case in which the unadjusted state indicated by the dotted line is substantially moved in parallel by the existence of the protective resistor r0. In this case, the effect of disposing a pair of constant current control sections 31, respectively, is not obtained.

Under the above circumstance, in the eighth embodiment mode, as shown in FIG. 19(a), resistor components r are disposed on the wiring voltages 321 between the respective gate wirings 322.

In this embodiment mode, the entire voltage wiring 311 connecting the constant current control sections 311 an 312 are formed of polysilicon resistors, with the result that the resistor components r and the protective resistors r0 are formed, respectively.

As described above, the amount of the voltage adjusted by the constant current control sections 311 and 312 is used as the voltage drop of the entire voltage wiring including the protective resistors r0 at both the ends with the arrangement of the resistor components r between the respective gate wirings 322. For that reason, as indicated by a solid line in FIG. 18(b), the inclination of the current value outputted from the respective output terminals O can be surely adjusted.

In the eighth embodiment mode, the entire voltage wiring 321 including the protective resistors r0 is formed of the polysilicon resistors. However, the voltage wiring 321 may be formed of the polysilicon resistor, and the protective resistor r0 may be additionally connected to the voltage wiring 321.

Also, the resistor components r except for the polysilicon resistors may be disposed on the voltage wirings 321. In this case, the resistor components r may be disposed between the respective gate wirings 322 or disposed at every predetermined intervals. As every given intervals, for example, if the resistor component r is disposed between the gate wirings 322R of the constant current output section 301 and the constant current output section 304, no resistor component r is disposed between the gate wirings 322R of the constant current output section 304 and the constant current output section 307, and the resistor component r is disposed between the gate wirings 322R of the succeeding constant current output section 307 and the succeeding constant current output section 3010. In this way, the resistor components r may be disposed at every two intervals. Also, the resistor components r may be disposed at every arbitrary selected number intervals such as every three intervals, every four intervals, every five intervals or every eleven intervals. In addition, the resistor components r may be disposed at one location in the center between the paired constant current control section 311 and constant current control section 312, at two locations of the trisection thereof or at three locations of the quadsection thereof.

Subsequently, a ninth embodiment mode will be described.

In the ninth embodiment mode, the constant current output driver 3 is formed of the different IC chips of a constant current output device 300 having s constant current output sections 30 and a constant current control unit 31 having three constant current control section 310.

FIG. 20 shows a constant current output device 300(a) and a constant current control unit 310 (b) of the constant current output driver 3 in the ninth embodiment mode.

Figure 20A:
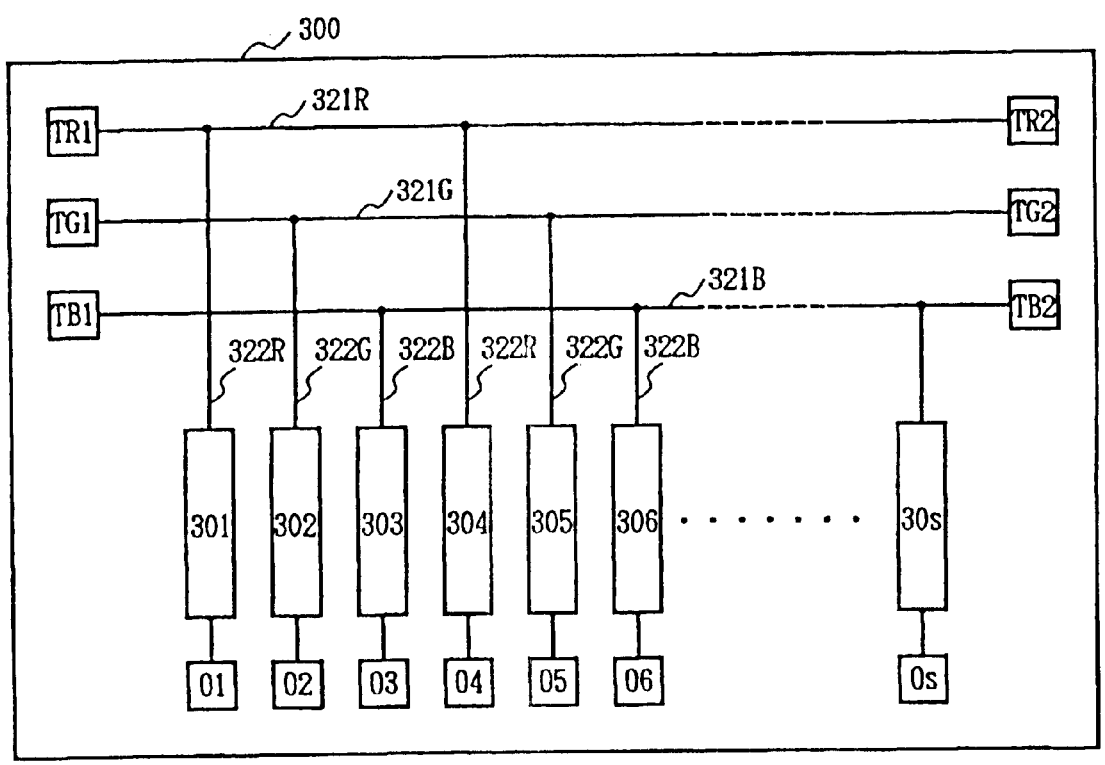
FIGS. 20 are a circuit structural diagram of a constant current output device (a) and a constant voltage generating device (b) in a ninth embodiment mode of the present invention.

As shown in FIG. 20(a), the constant current output device 300 includes a pair of wiring terminals TR, a pair of wiring terminals TG and a pair of wiring terminals TB, that is the six wiring terminals TR1 and TR2, TG1 and TG2, and TB1 and TB2 in total (representatively referred to as "T1 and T2") The respective paired wiring terminals T1 and T2 are connected to each other by the voltage wirings 321, and the voltage wirings 321 are connected with every three constant current output sections 30 by the gate wirings 322.

Figure 20B:
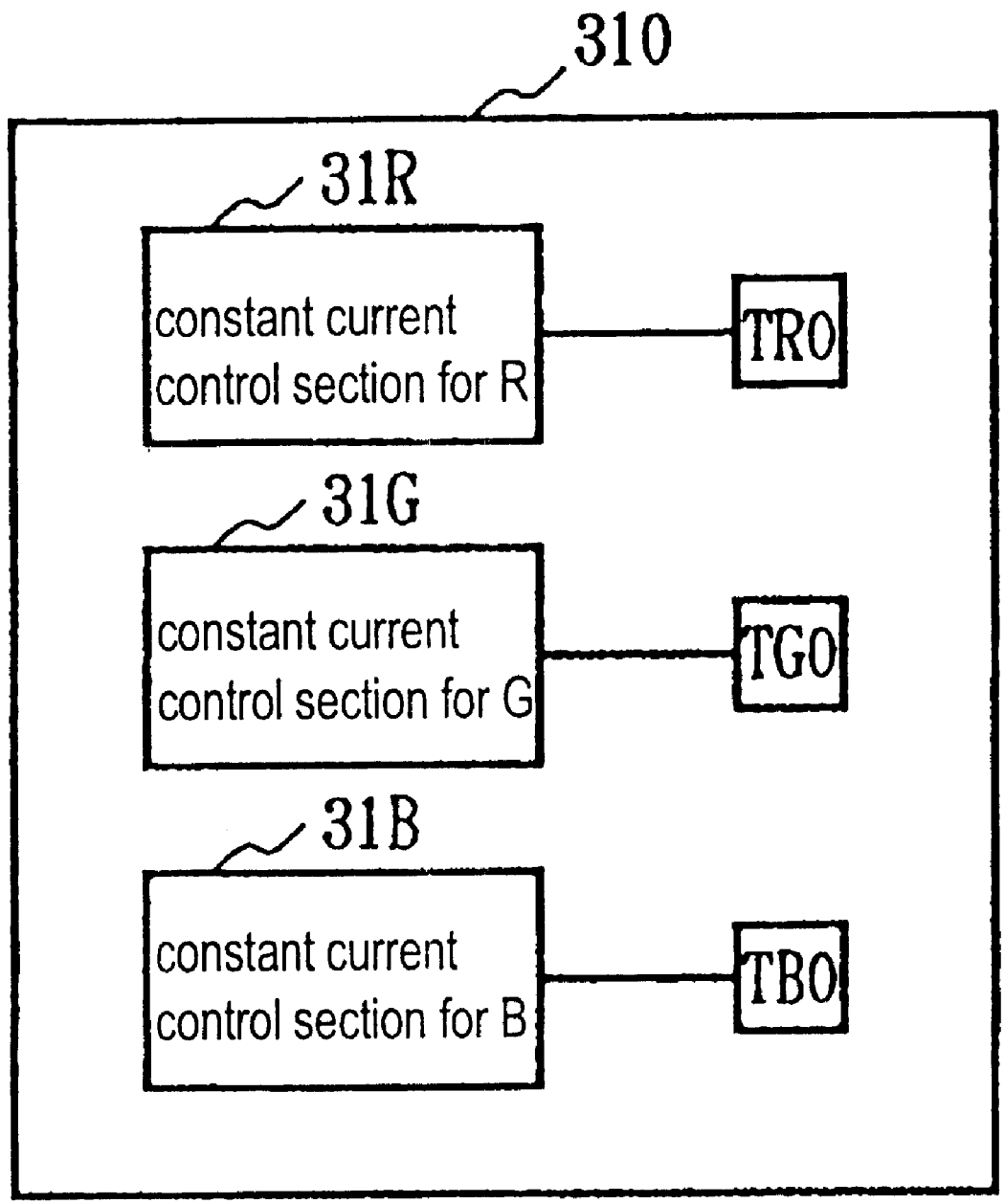

On the other hand, as shown in FIG. 20(b), the constant current control unit 310 includes a constant current control section for R 31R, a constant current control section for G 31G and a constant current control section for B 31B, and the respective constant current control sections 31 are connected with the wiring terminals TR0 and TG0 and TGB, respectively.

Figure 21:
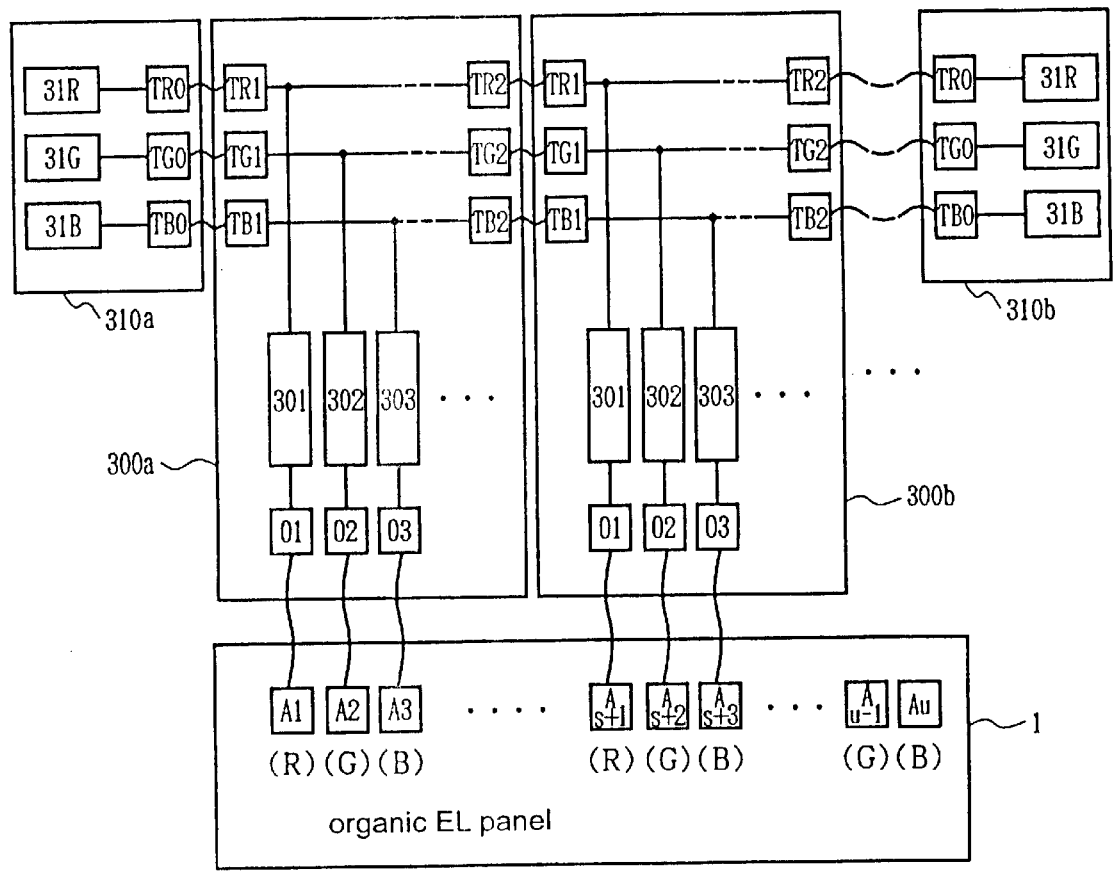
FIG. 21 is an explanatory diagram showing the use condition in the ninth embodiment mode of the present invention.

FIG. 21 shows a state in which the constant current output device 300 and the constant current control unit 310 are connected to each other in the ninth embodiment mode.

As shown in the figure, the color organic EL panel 1 having u anode terminals A1 to Au (TR1 and TR2, TG1 and TG2, TB1 and TB2) are connected with q constant current output devices 300a, 300b, . . . 300q.

Then, in the adjacently disposed constant current output devices 300, the wiring terminal TR2 and the wiring terminal TR1 are connected to each other, the wiring terminal TG2 and the wiring terminal TG1 are connected to each other, and the wiring terminal TB2 and the wiring terminal TB1 are connected to each other.

On the other hand, out of the constant current output devices 300 disposed at both the ends, the wiring terminals TR1, TG1 and TB1 of the constant current output device 300a are connected to the wiring terminals TR0, TG0 and TB0 of the constant current control unit 310a, respectively, and the wiring terminals TR2, TG2 and TB2 of the constant current output device 300b are connected to the wiring terminals TR0, TG0 and TB0 of the constant current control unit 310b, respectively.

As described above, according to this embodiment mode, since the constant current output driver 3 is made up of the separate elements of the constant current output device 300 and the constant current control unit 310, the voltage wirings 321 of the plural constant current output devices 300 can be continuously connected to each other, and the constant current output driver 3 can be structured by using at least one of the constant current control units 310 (a case in which the constant current control unit 310b is not connected in FIG. 21), thereby making it possible to reduce the number of the constant current control sections 31.

The above description was given of a case in which all the voltage wirings 321 of q constant current output devices 300 are connected. However, the plural voltage wirings 321 as one unit may be connected to each other, and the constant current output devices 300 may be connected. For example, q constant current output devices 300 is divided into two groups each having q/2 constant current output devices 300, and the adjacent q/2 voltage wirings 321 are connected to each other, and the constant current output devices 300 at both ends or one end are connected with the constant current control unit 310.

Also, in the voltage wirings 321 according to the ninth embodiment mode, the entire voltage wirings 321 are formed of the polysilicon resistors as in the eighth embodiment mode, or the resistor components r may be disposed partially.

In the above-described sixth to ninth embodiments, the respective constant current output sections 301 to 30s are made identical in structure, and the respective constant current control sections 31R, 31G and 31B are made identical in structure except for the values of the resistors RR, GG and BB, as the result of which the structure within the chip is simplified to make manufacturing easy.

However, it is presumed that appropriate current values for R, G and B are not obtained depending on the kind of the connected organic EL panel 1 or a demand on control. In this case, the constant current output sections for R 301, 304, ... 30(s−2) may be made identical in structure, the constant current output sections for G 302, 305, ... 30(s−1) may be made identical in structure, and the constant current output sections for B 303, 306, ... 30s may be made identical in structure. Also, the structure of the respective constant current control sections 31R, 31G and 31B are adapted to the corresponding constant current output sections 30 for R, G and B. In this case, the constant current FET 51 of the constant current control section for R 31R and the constant current FET for R 50 are formed of elements having the same temperature characteristic, the constant current FET 51 of the constant current control section for G 31G and the constant current FET for G 50 are formed of elements having the same temperature characteristic, and the constant current FET 51 of the constant current control section for B 31B and the constant current FET for B 50 are formed of elements having the same temperature characteristic.

According to the present invention, since the switching element is disposed between the power supply and the constant current element without the switching element being disposed between the constant current output element and the output terminal, over-shoot occurring in the current outputted from the output terminal can be suppressed.

Also, since the FET that applies a constant voltage to the gate is disposed between the constant current output element and the output terminal, a change of the output constant current value depending on the voltage can be reduced, and a variation of the constant current value due to switching can also be suppressed.

Further, the constant current output driver is structured by: an output terminal; a first field effect transistor connected between the output terminal and a power supply, for outputting a constant current with the application of a constant voltage to a gate thereof; switching means connected between the first field effect transistor and the output terminal or the power supply, for electrically connecting or disconnecting the first field effect transistor and the output terminal or the power supply; and a constant voltage applying circuit having a temperature characteristic which changes in the same manner as the temperature characteristic of the first field effect transistor, for applying a constant voltage to the first field effect transistor at a constant temperature. With this structure, a change of the output current due to the temperature can be reduced.

Still further, the constant current output driver is structured by: a plurality of output terminals; field effect transistors the number of which is equal to that of the output terminals, which are connected between the output terminals and a power supply and which output a constant current with the application of a given voltage to gates thereof; switching means for electrically connecting and disconnecting the respective field effect transistors and the respective output terminals or the power supply, independently; a first constant current control section that generates a first voltage; a second constant current control section that generates a second voltage; a third constant current control section that generates a third voltage; a first wiring that connects an output of the first constant current control section to every three gates of the plurality of field effect transistors; a second wiring that connects an output of the second constant current control section to the gates of the respective field effect transistors adjacent to the respective field effect transistors to which the first wiring is connected; and a third wiring that connects an output of the third constant current control section to the gates of the respective field effect transistors further adjacent to the respective field effect transistors to which the second wiring is connected. With this structure, connection to the light emitting element panel for color display can be made by a single-layer wiring.

What is claimed is:

1. A constant current output driver for emitting a light from a light emitting element by supplying a constant current, the constant current output driver comprising:
   a constant current output element that outputs a constant current;
   a first switching element disposed between the constant current output element and a power supply for electrically connecting and disconnecting the power supply and the constant current output element; and
   a first output terminal connected to a current output side of the constant current output element with no switching element disposed therebetween.

2. A constant current output driver for emitting a light from a light emitting element by supplying a constant current, the constant current output driver comprising:
   a constant current output element that outputs a constant current;
   a first switching element disposed between the constant current output element and a power supply for electrically connecting and disconnecting the power supply and the constant current output element;
   a second switching element connected between a current output side of the constant current output element and a second terminal for performing an on/off operation in association with the on/off operation performed by the first switching element; and
   a first output terminal connected between the current output side of the constant current output element and the second switching element with no switching element disposed therebetween.

3. A constant current output driver comprising:
   a first field effect transistor for outputting a constant current in response to the application of a constant voltage to a gate thereof;
   a second field effect transistor disposed between the first field effect transistor and a power supply for electrically connecting and disconnecting the power supply and the first field effect transistor; and
   a first output terminal connected to a current output side of the first field effect transistor with no switching element being disposed between the first output terminal and the current output side of the first field effect transistor.

4. A constant current output driver comprising:
   a first field effect transistor for outputting a constant current in response to the application of a constant voltage to a gate thereof;

a second field effect transistor disposed between the first field effect transistor and a power supply for electrically connecting and disconnecting the power supply and the first field effect transistor;

a third field effect transistor connected in series with a current output side of the first field effect transistor and having a gate applied with a constant voltage different from the constant voltage which is applied to the gate of the first field effect transistor; and a first output terminal connected to a current output side of the third field effect transistor with no switching element disposed therebetween.

5. A constant current output driver comprising:

a first field effect transistor for outputting a constant current in response to the application of a constant voltage to a gate thereof;

a second field effect transistor disposed between the first field effect transistor and a power supply for electrically connecting and disconnecting the power supply and the first field effect transistor;

a third field effect transistor having a channel region different from that of the second field effect transistor and being connected between a current output side of the first field effect transistor and a second terminal, the third field effect transistor having a gate commonly connected to an input terminal together with a gate of the second field effect transistor; and a first output terminal connected between a current output side of the first field effect transistor and the third field effect transistor with no switching element disposed therebetween.

6. A constant current output driver comprising:

a first field effect transistor for outputting a constant current in response to the application of a constant voltage to a gate thereof;

a second field effect transistor disposed between the first field effect transistor and a power supply for electrically connecting and disconnecting the power supply and the first field effect transistor;

a third field effect transistor connected in series with a current output side of the first field effect transistor and having a gate supplied with a constant voltage different from the constant voltage which is applied to the gate of the first field effect transistor;

a fourth field effect transistor having a channel region different from that of the second field effect transistor, connected between a current output side of the third field effect transistor and a second terminal, and having a gate commonly connected to an input terminal together with a gate of the second field effect transistor; and a first output terminal connected between the current output side of the third field effect transistor and the fourth field effect transistor with no switching element disposed therebetween.

7. A constant current output driver comprising:

a first field effect transistor connected to a power supply for outputting a constant current in response to the application of a constant voltage to a gate thereof;

a second field effect transistor connected in series with a current output side of the first field effect transistor for conducting a switching operation;

a third field effect transistor connected in series with a current output side of the second field effect transistor and having a gate supplied with a constant voltage different from the constant voltage which is applied to the gate of the first field effect transistor;

a fourth field effect transistor having a channel region different from that of the second field effect transistor, connected between a current output side of the third field effect transistor and a second terminal, and having a gate commonly connected to an input terminal together with a gate of the second field effect transistor; and a first output terminal connected between the current output side of the third field effect transistor and the fourth field effect transistor with no switching element disposed therebetween.

8. A constant current output driver comprising:

a first field effect transistor connected to a power supply for outputting a constant current in response to the application of a constant voltage to a gate thereof;

a second field effect transistor connected in series with a current output side of the first field effect transistor and having a gate supplied with a constant voltage different from the constant voltage which is applied to the gate of the first field effect transistor;

a third field effect transistor connected in series with a current output side of the second field effect transistor for conducting a switching operation;

a fourth field effect transistor having a channel region different from that of the third field effect transistor, connected between a current output side of the third field effect transistor and a second terminal, and having a gate commonly connected to an input terminal together with a gate of the second field effect transistor; and a first output terminal connected between the current output side of the third field effect transistor and the fourth field effect transistor with no switching element disposed therebetween.

9. A constant current output driver comprising:

an output terminal;

a first field effect transistor connected between the output terminal and a power supply for outputting a constant current in response to the application of a constant voltage to a gate thereof;

switching means connected between the first field effect transistor and one of the output terminal or the power supply for electrically connecting and disconnecting the first field effect transistor and one of the output terminal or the power supply; and a constant voltage applying circuit having a temperature characteristic which changes in the same manner as the temperature characteristic of the first field effect transistor for applying a constant voltage to the first field effect transistor at a constant temperature.

10. A constant current output driver according to claim 1; further comprising a constant voltage applying circuit comprised of voltage dividing resistor means for dividing an input voltage, and a second field effect transistor connected in serial between the voltage dividing resistor means and the power supply and having a gate connected in a saturated state; wherein the first switching element comprises a first field effect transistor and a gate of the second field effect transistor is connected to a gate of the first field effect transistor.

11. A constant current output driver according to claim 2; wherein the first switching element comprises a first field effect transistor having a gate which inputs a switching signal and the second switching element comprises a second field effect transistor; and further comprising a third field effect transistor which has a gate connected to ground and which is also connected to one of a power supply side or the second field effect transistor at a connection position of the first field effect transistor.

12. A constant current output driver according to claim 2; wherein the first and second switching elements comprise a first field effect transistor and a second field effect transistor formed of the same standard elements.

13. A constant current output driver according to claim 10; wherein the voltage dividing resistor means comprises one of the combination of a resistor ladder, a variable resistor, and a terminal to which a resistor is externally attached, or a resistor and a terminal to which another resistor is externally attached connected in parallel to the terminal.

14. A constant current output driver according to any one of claims 3 to 6; further comprising a voltage follower circuit; wherein a gate of the second field effect transistor is connected to an input of the voltage follower circuit, and an output of the voltage follower circuit is connected to a gate of the first field effect transistor.

15. A constant current output driver integrated circuit comprising:
    a first plurality of output terminals;
    a first plurality of field effect transistors each connected between a respective output terminal and a power supply for outputting a constant current in response to the application of a given voltage to a gate thereof;
    switching means for electrically connecting and disconnecting the respective field effect transistors and one of the respective output terminals or the power supply, independently;
    a first constant current control section for generating a first voltage;
    a second constant current control section for generating a second voltage;
    a third constant current control section for generating a third voltage;
    a first wiring pattern for connecting an output of the first constant current control section to a gate of every third one of the first plurality of field effect transistors;
    a second wiring pattern for connecting an output of the second constant current control section to gates of respective field effect transistor transistors adjacent to the respective field effect transistors to which the first wiring pattern is connected; and
    a third wiring pattern for connecting an output of the third constant current control section to gates of respective field effect transistors further adjacent to the respective field effect transistors to which the second wiring pattern is connected.

16. A constant current output driver according to claim 15; wherein the number of the output terminals and the number of the field effect transistors is 192, respectively.

17. A constant current output driver according to either one of claim 15 or 16; further comprising a first wiring terminal to which the first wiring pattern is connected, a second wiring terminal to which the second wiring pattern is connected, and a third wiring terminal to which the third wiring pattern is connected.

18. A constant current output driver according to either one of claim 15 or 16; further comprising another first constant current control section, another second constant current control section, and another third constant current control section; wherein the first wiring pattern includes a first voltage wiring pattern that connects outputs of both first constant current control sections to each other, and a first gate wiring pattern that connects the first voltage wiring pattern and the respective gates; wherein the second wiring pattern includes a second voltage wiring that connects outputs of both second constant current control sections to each other, and a second gate wiring pattern that connects the second voltage wiring pattern and the respective gates; and wherein the third wiring pattern includes a third voltage wiring pattern that connects outputs of both third constant current control sections to each other, and a third gate wiring pattern that connects the third voltage wiring pattern and the respective gates.

19. A constant current output driver according to claim 18; further comprising a resistor disposed on the voltage wiring pattern between at least one pair of gate wiring patterns.

20. A constant current output driver according to claim 18; wherein the voltage wiring is formed of a polysilicon resistor.

21. A constant current output driver integrated circuit comprising:
    a first plurality of output terminals;
    a first plurality of field effect transistors each connected between a respective output terminal and a power supply for outputting a constant current in response to the application of a given voltage to a gate thereof;
    switching means for electrically connecting and disconnecting the respective field effect transistors and one of the respective output terminals or the power supply, independently;
    first, second and third voltage input terminals to which an input voltage is applied;
    first, second and third voltage output terminals from which the input voltage is output;
    a first voltage wiring pattern for connecting the first voltage input terminal and the first voltage output terminal;
    a second voltage wiring pattern for connecting the second voltage input terminal and the second voltage output terminal;
    a third voltage wiring pattern for connecting the third voltage input terminal and the third voltage output terminal;
    a first gate wiring pattern for connecting the first voltage wiring pattern to a gate of every third one of the first plurality of field effect transistors;
    a second gate wiring pattern for connecting the second voltage wiring pattern to gates of respective field effect transistors adjacent to the respective field effect transistors to which the first wiring pattern is connected; and
    a third gate wiring pattern for connecting the third voltage wiring pattern to gates of respective field effect transistors further adjacent to the respective field effect transistors to which the second wiring pattern is connected.

* * * * *